United States Patent
Ichii

(10) Patent No.: US 10,663,721 B2
(45) Date of Patent: May 26, 2020

(54) IMAGE DISPLAY APPARATUS AND OBJECT APPARATUS

(71) Applicant: Daisuke Ichii, Kanagawa (JP)

(72) Inventor: Daisuke Ichii, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 134 days.

(21) Appl. No.: 15/141,029

(22) Filed: Apr. 28, 2016

(65) Prior Publication Data
US 2016/0320616 A1    Nov. 3, 2016

(30) Foreign Application Priority Data
Apr. 28, 2015   (JP) .................................. 2015-091992

(51) Int. Cl.
*G09G 5/00*   (2006.01)
*G06F 3/14*   (2006.01)
(Continued)

(52) U.S. Cl.
CPC ..... *G02B 27/0101* (2013.01); *G02B 27/0149* (2013.01); *G02B 27/0172* (2013.01);
(Continued)

(58) Field of Classification Search
CPC ............ G02B 27/0101; G02B 27/0172; G02B 2027/0112; G02B 2027/0159;
(Continued)

(56) References Cited

U.S. PATENT DOCUMENTS

| 5,760,931 A | 6/1998 | Saburi et al. |
| 7,046,215 B1 * | 5/2006 | Bartlett .................. G01S 5/163 345/8 |

(Continued)

FOREIGN PATENT DOCUMENTS

| DE | 10 2013 208 971 A1 | 11/2014 |
| EP | 0 631 167 A1 | 12/1994 |

(Continued)

OTHER PUBLICATIONS

U.S. Appl. No. 14/885,246, filed Oct. 16, 2015.
(Continued)

*Primary Examiner* — Robert J Michaud
(74) *Attorney, Agent, or Firm* — Oblon, McClelland, Maier & Neustadt, L.L.P.

(57) ABSTRACT

An image display apparatus (1000) mounted on an object or attached to a human body, includes: an image forming unit (200) to form an image with light; an optical system including a curved mirror (9) that reflects the light forming the image toward a bent transmission and reflection member; and a rotator (310) to rotate the curved mirror (9) about a prescribed axis. A first projection image, which is a projection image on an XY plane of the image, forms an angle $\theta 1$ with respect to an X direction. A second projection image, which is a projection image on an XY plane of the prescribed axis, forms an angle $\theta 2$ with respect to the X direction. The X denotes a lateral direction of the object or the human body and the Y direction denotes a vertical direction of the object or the human body.

19 Claims, 14 Drawing Sheets

(51) Int. Cl.
    *G02B 27/01*     (2006.01)
    *G06T 3/20*     (2006.01)

(52) U.S. Cl.
    CPC ........... *G02B 27/0179* (2013.01); *G06F 3/14* (2013.01); *G06T 3/20* (2013.01); *G09G 5/00* (2013.01); *G02B 2027/015* (2013.01); *G02B 2027/0112* (2013.01); *G02B 2027/0145* (2013.01); *G02B 2027/0159* (2013.01); *G02B 2027/0181* (2013.01); *G02B 2027/0187* (2013.01)

(58) Field of Classification Search
    CPC ...... G02B 2027/015; G02B 2027/0187; G02B 2027/0181; G02B 2027/0145; G09G 5/00; G06T 3/20; G06F 3/14
    See application file for complete search history.

(56) References Cited

U.S. PATENT DOCUMENTS

| | | | |
|---|---|---|---|
| 8,711,485 B2 | 4/2014 | Schliep et al. | |
| RE45,945 E | 3/2016 | Hayashi et al. | |
| 9,921,413 B2* | 3/2018 | Xu | G02B 27/2221 |
| 2008/0018555 A1* | 1/2008 | Kuo | G02B 17/006 |
| | | | 345/8 |
| 2009/0278765 A1 | 11/2009 | Stringfellow | |
| 2011/0228368 A1 | 9/2011 | Sakai et al. | |
| 2012/0044315 A1 | 2/2012 | Shibayama et al. | |
| 2012/0099032 A1* | 4/2012 | Ishikawa | G02B 27/0101 |
| | | | 349/11 |
| 2013/0127973 A1 | 5/2013 | Ichii | |
| 2013/0194518 A1* | 8/2013 | Moussa | G02B 7/1821 |
| | | | 349/11 |
| 2013/0201540 A1 | 8/2013 | Sasaki et al. | |
| 2013/0286150 A1 | 10/2013 | Sato et al. | |
| 2014/0133002 A1 | 5/2014 | Tatsuno et al. | |
| 2014/0145933 A1* | 5/2014 | Chae | B60K 37/06 |
| | | | 345/156 |
| 2014/0177022 A1* | 6/2014 | Saisho | G02B 26/101 |
| | | | 359/205.1 |
| 2014/0333647 A1* | 11/2014 | Lee | G02B 27/0179 |
| | | | 345/589 |
| 2015/0019048 A1* | 1/2015 | Krishna | B64D 45/00 |
| | | | 701/4 |
| 2015/0055204 A1 | 2/2015 | Ichii | |
| 2015/0219803 A1 | 8/2015 | Inamoto et al. | |
| 2016/0133655 A1* | 5/2016 | Egami | H01L 27/1259 |
| | | | 257/71 |
| 2016/0187648 A1* | 6/2016 | Chou | G02B 27/0101 |
| | | | 359/633 |
| 2016/0283805 A1* | 9/2016 | Abhau | G06K 9/00818 |
| 2016/0291325 A1* | 10/2016 | Kasahara | G02B 27/0101 |

FOREIGN PATENT DOCUMENTS

| | | |
|---|---|---|
| JP | 3418985 | 6/2003 |
| JP | 2005-331831 | 12/2005 |
| JP | 2009-196473 | 9/2009 |
| JP | 2011-123126 | 6/2011 |
| JP | 2012-168542 | 9/2012 |
| JP | 2013-160819 | 8/2013 |
| JP | 2014-016414 | 1/2014 |
| JP | 2015-022158 | 2/2015 |
| JP | 2015-041039 | 3/2015 |
| JP | 2015-145962 | 8/2015 |
| JP | 2015-232691 | 12/2015 |
| JP | 2015-232692 | 12/2015 |
| JP | 2015-232693 | 12/2015 |

OTHER PUBLICATIONS

Extended European Search Report dated Sep. 15, 2016 in Patent Application No. 16167145.8.
Office Action dated Jan. 28, 2019, in Japanese Patent Application No. 2015-091992.

* cited by examiner

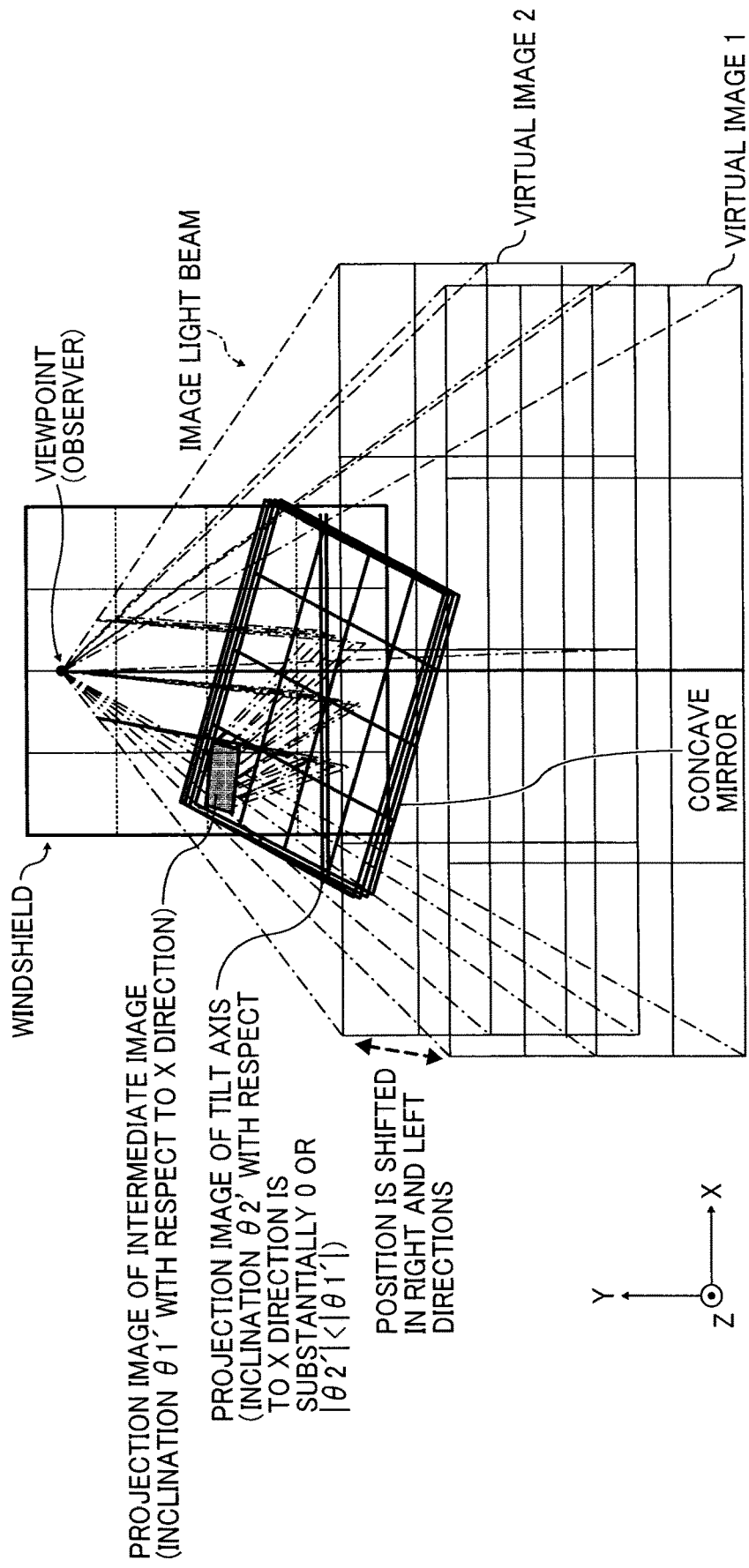

IMAGE DISPLAY APPARATUS AND OBJECT APPARATUS

CROSS-REFERENCE TO RELATED APPLICATIONS

This patent application is based on and claims priority pursuant to 35 U.S.C. § 119(a) to Japanese Patent Application No. 2015-091992, filed on Apr. 28, 2015, in the Japan Patent Office, the entire disclosure of which is hereby incorporated by reference herein.

BACKGROUND

Technical Field The present invention relates to an image display apparatus and an object apparatus including the image display apparatus.

Description of the Related Art

Recently, an apparatus that leads image light into a transmission and reflection member (for example, a windshield of a mobile object) and makes a virtual image visible through the transmission and reflection member has been developed.

For example, heads-up display apparatuses disclosed in JP-5251853-B and JP-2009-196473-A have a function to adjust a display position of a virtual image.

However, with these heads-up display apparatuses, it has been difficult to achieve downsizing and visibility at the same time while controlling influence on a function to adjust a display position of a virtual image.

SUMMARY

Example embodiments of the present invention include an image display apparatus mounted on an object or attached to a human body, which includes: an image forming unit to form an image with light; an optical system including a curved mirror that reflects the light forming the image toward a bent transmission and reflection member; and rotator to rotate the curved mirror about a prescribed axis. A first projection image, which is a projection image on an XY plane of the image, forms an angle θ1 with respect to an X direction. A second projection image, which is a projection image on an XY plane of the prescribed axis, forms an angle θ2 with respect to the X direction. The X denotes a lateral direction of the object or the human body and the Y direction denotes a vertical direction of the object or the human body.

Example embodiments of the present invention include an image display apparatus mounted on an object or attached to a human body, which includes an image forming unit to form an image with light; an optical system including a curved mirror that reflects the light forming the image toward a bent transmission and reflection member; a rotator to rotate the curved mirror about a prescribed axis; and a processing device to adjust a position of the image in an X direction in response to rotation of the curved mirror about the prescribed axis by the rotator. A projection image on an XY plane of the image forms an angle θ1 with respect to the X direction, where the X denotes a lateral direction of the object or the human body and the Y direction denotes a vertical direction of the object or the human body.

Example embodiments of the present invention include an image display apparatus provided for an object or attached to a human body, which includes an image forming unit to form an image with light; an optical system including a curved mirror that reflects the light forming the image toward a bent transmission and reflection member; a rotation mechanism to rotate the curved mirror about a prescribed axis; and a controller to adjust an angle θ2 formed by a projection image on an XY plane of the prescribed axis with respect to an X direction in response to a rotation amount of the curved mirror about the prescribed axis by the rotation mechanism. A projection image on an XY plane of the image forms an angle θ1 with respect to the X direction, where the X denotes a lateral direction of the object or the human body and the Y direction denotes a vertical direction of the object or the human body.

Example embodiments of the present invention include an image display apparatus mounted on an object or attached to a human body, which includes an image forming unit to form an image with light; an optical system including a curved mirror that reflects the light forming the image toward a bent transmission and reflection member; and a rotator to rotate the curved mirror about a prescribed axis. A projection image on an XY plane of the image forms an angle θ1 with respect to an X direction. The image display apparatus controls position shift due to rotation of the curved mirror about the prescribed axis by the rotator in the X direction of a virtual image of the image visually recognized through the transmission and reflection member, where X denotes a lateral direction of the object or the human body and Y denotes a vertical direction of the object or the human body.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9 illustrates a lateral shift when the height of a virtual image is adjusted in a comparative example.

Figure 1A:
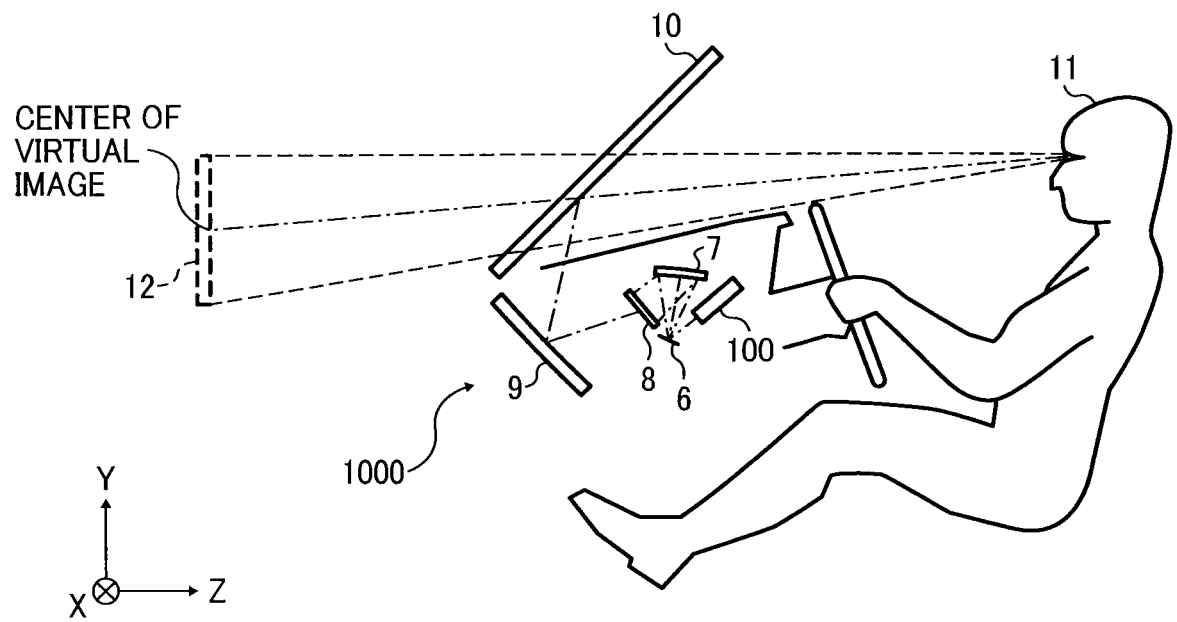
FIGS. 1A to 1C each illustrate a selected portion of an image display apparatus according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Example embodiments of the present invention are described below.

An image display apparatus 1000 according to an example embodiment of the present invention is a heads-up display (HUD) that displays a two-dimensional color image. FIG. 1A is a schematic diagram of a portion of the image display apparatus 1000.

The image display apparatus 1000 is provided, for example, for a mobile object such as a vehicle, an aircraft, and a ship, and makes navigation information used for operating the mobile object (for example, speed and mileage) visible through a front windshield 10 of the mobile object. In such cases, in addition to the original capability as a windshield, the front windshield 10 also serves as a transmission and reflection member that transmits a portion of the incident light and reflects at least some of the remaining incident light. In the following description, an XYZ three-dimensional orthogonal coordinate system that is set to the mobile object (i.e., a coordinate system that moves with the mobile object in a synchronized manner) is referred to. The X-axis direction, Y-axis direction, and Z-axis direction indicate the right and left directions of the mobile object (+X direction indicates the right direction, and −X direction indicates the left direction), the up-and-down directions of the mobile object (+Y direction indicates the up direction, and −Y direction indicates the down direction), and the forward and backward directions of the mobile object (−Z direction indicates the forward direction, and +Z direction indicates the backward direction), respectively. In the following description, cases in which the image display apparatus 1000 is provided for a vehicle (e.g., a car) are mainly described.

In FIG. 1A, the light source 100 emits a pixel displaying beam LC for displaying a color image.

The pixel displaying beam LC is a bundle of beams in which beams of three colors including red (R), green (G), and blue (B) are combined.

Figure 1B:
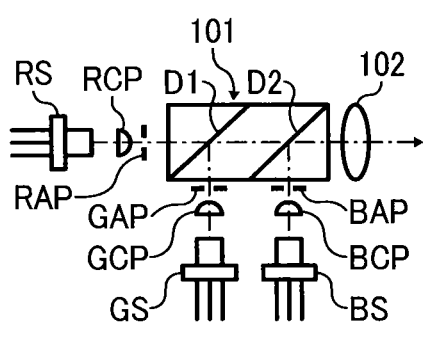

More specifically, a light source 100 is configured, for example, as illustrated in FIG. 1B.

In FIG. 1B, semiconductor lasers RS, GS, and BS, which form a light source, emit laser beams of red, green, and blue (RGB), respectively. In the present example embodiment, laser diodes (LD), which are also referred to as end-surface emitting lasers, are used as the semiconductor lasers RS, GS, and BS. Alternatively, vertical cavity-surface emitting lasers (VCSEL) may be used as the semiconductor lasers RS, GS, and BS, instead of the end-surface emitting lasers. The semiconductor lasers RS, GS, and BS are each controlled by a processing device 50 (FIG. 7) according to image information.

As illustrated in FIG. 1B, coupling lenses RCP, GCP, and BCP control the divergence of the laser beams emitted from the semiconductor lasers RS, GS, and BS.

The laser-beam bundles of RGB colors whose divergence has been controlled by the coupling lenses RCP, GCP, and BCP are shaped by apertures RAP, GAP, and BAP. More specifically, the diameters of the laser-beam bundles of RGB colors are controlled by the apertures RAP, GAP, and BAP.

The shaped laser-beam bundles of RGB colors enter the beam combining prism 101.

The beam combining prism 101 includes a dichroic film D1 that transmits the R light and reflects the G light, and a dichroic film D2 that transmits the R and G light and reflects the B light.

Accordingly, a single laser-beam bundle in which the laser-beam bundles of RGB colors are combined is emitted from the beam combining prism 101.

The emitted laser-beam bundle is converted by a lens 102 into a "collimated beam" of prescribed diameter of laser-beam bundle.

This "collimated beam" corresponds to the pixel displaying beam LC.

The processing device 50 modules intensities of the laser beams of the respective colors R, G, and B, constituting the pixel displaying beam LC, according to an image signal of the two-dimensional color image to be displayed. The intensity modulation may be performed through direct modulation in which the semiconductor lasers are directly modulated or through external modulation in which the laser-beam bundles emitted from the semiconductor lasers are modulated.

In other words, the light-emission intensity of each of the semiconductor lasers RS, GS, and BS may be modulated by a driving unit according to the image signal of RGB components.

The pixel displaying beam LC that is emitted from the light source 100 enters a two-dimensional deflector 6 that serves as an image forming element, and is two-dimensionally deflected.

In the present example embodiment, the two-dimensional deflector 6 moves a minute mirror on a pivot that is formed by "two axes that are orthogonal to each other".

More specifically, the two-dimensional deflector 6 consists of micro-electromechanical systems (MEMS) that are formed as a minute pivoting mirror by semiconductor processes or the like.

Figure 2:
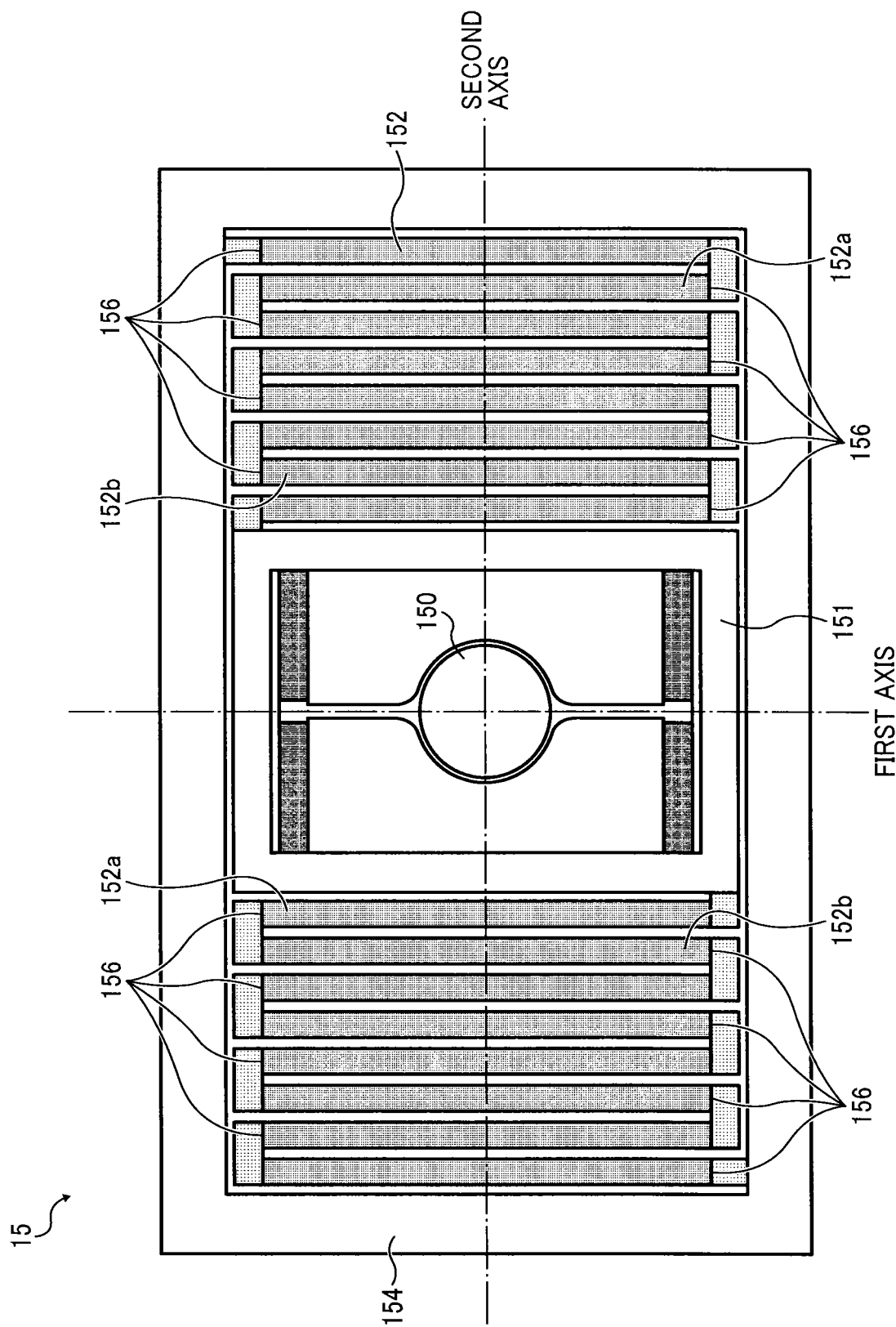
FIG. 2 illustrates a light deflector that serves as a two-dimensional deflector, according to the present example embodiment.

FIG. 2 illustrates a light deflector that serves as a two-dimensional deflector, according to the present example embodiment. As illustrated in FIG. 2, a light deflector 15 that is an example of the two-dimensional deflector 6 is a MEMS mirror that is manufactured by semiconductor processes. The light deflector 15 has a reflection plane, and includes a mirror 150 that is supported by a first frame 151 in a rotatable manner around a first axis, and supporting structure that supports the first frame 151 in a rotatable manner around a second axis that is orthogonal to the first axis. The supporting structure includes a pair of serpentine units 152 that are coupled to each other in such a manner that a plurality of beams meander, and a second frame 154 that supports the serpentine units. The serpentine units 152 are connected to the first frame 151 at one end, and are connected to the second frame 154 at the other end. Each of the beams of the serpentine units 152 is provided with a plurality of piezoelectric materials 156 (for example, PZT (lead zirconate titanate)). By applying different voltage to two of the piezoelectric materials 156 that are provided for the two neighboring beams 152a and 152b of the serpentine units 152, respectively, these two neighboring beams 152a and 152b warp in different directions. According to the accumulated warpage, the mirror 150 oscillates around the second axis with a wide angle. Due to such configuration as above, the optical scanning around the second axis (for example, the optical scanning in the sub-scanning direction) can be performed with low voltage. On the other hand, the optical scanning with resonance around the first axis (for example, the optical scanning in the main-scanning direction) is performed using, for example, a torsion bar that is connected to the mirror 150 and a piezoelectric actuator including a cantilever and a piezoelectric material (e.g., a PZT) that are connected between the torsion bar and the first frame 151. The light deflector 15 further includes a detector, which detects oscillation of the mirror 150 around the first axis and the second axis, and outputs the detected oscillation to the processing device 50 as detection information. The processing device 50 controls driving each of the semiconductor lasers based on detection information and image information.

However, no limitation is intended thereby, and the two-dimensional deflector 6 may be, for example, combinations of two minute mirrors that pivot on a single axis in the directions that are orthogonal to each other.

The pixel displaying beam LC that has been two-dimensionally deflected as above enters a concave mirror 7, and is reflected to a to-be-scanned surface 8.

The concave mirror 7 is designed to correct the bending of the scanning line (scanning trajectory) occurred on the to-be-scanned surface 8.

In other words, the concave mirror 7 corrects the deformation of an image formed on the front windshield 10 by the two-dimensionally deflected pixel displaying beam LC.

The pixel displaying beam LC that is reflected at the concave mirror 7 shifts in parallel according to the deflection performed by the two-dimensional deflector 6, and enters the to-be-scanned surface 8 to scan the to-be-scanned surface 8 two-dimensionally. In other words, the to-be-scanned surface 8 is two-dimensionally scanned by light in a main-scanning direction and sub-scanning direction. More specifically, for example, raster scanning is performed in which high-speed scanning is performed in a main-scanning direction and low-speed scanning is performed in a sub-scanning direction.

By performing such a two-dimensional scanning as described above, a "two-dimensional color image" is generated on the to-be-scanned surface 8 as an intermediate image.

Accordingly, the light source 100, a two-dimensional deflector 6, the concave mirror 7, and the to-be-scanned surface 8 together configure an intermediate image generator 200 (image forming unit) that forms an intermediate image (image) by light. Moreover, the two-dimensional deflector 6 and the concave mirror 7 together configure a scanning optical system that scans the to-be-scanned surface 8 two-dimensionally by the light from the light source 100 in a main-scanning direction and sub-scanning direction.

As a matter of course, what is displayed on the to-be-scanned surface 8 is "only the pixels that are being irradiated by the pixel displaying beam LC at that time".

A two-dimensional color image is formed as a "set of pixels that are momentarily displayed" realized by two-dimensional scanning using the pixel displaying beam LC.

A "two-dimensional color image" is formed on the to-be-scanned surface 8 as described above, and the light of the image data on a pixel by pixel basis enters the concave mirror 9 that serves as a curved mirror and is reflected.

The to-be-scanned surface 8 includes a "minute convex lens arrangement", as will be described later. The concave mirror 9 configures a "virtual image forming optical system" (projection optical system).

The concave mirror 9 is designed and arranged to correct a factor in optical deformation in which the horizontal line (i.e., the straight line that extends in the right and left directions) of the "two-dimensional color image" (i.e., intermediate image) formed on the to-be-scanned surface 8 become convex upward or downward due to the influence of the front windshield 10.

The "virtual image forming optical system" forms the magnified virtual image 12 of the "two-dimensional color image".

The windshield 10 is arranged between the image forming position of the magnified virtual image 12 and an observer 11, and the front windshield 10 reflects the laser-beam bundle that forms the magnified virtual image 12 towards the observer 11. The observer 11 (for example, a driver of the mobile object) visually recognizes the virtual image at a prescribed position on the optical path of the laser beam reflected by the front windshield 10 (i.e., transmission and reflection member).

The observer 11 visually recognizes the magnified virtual image 12 by the light reflected towards the observer 11 as above.

In FIG. 1A, the Y-axis direction usually corresponds to the up-and-down directions for the observer 11, and the Y-axis direction is also referred to as a "vertical direction".

In FIG. 1A, the X-axis direction usually corresponds to the right and left directions for the observer 11, and the X-axis direction is also referred to as a "lateral direction".

As described above, the to-be-scanned surface 8 has a minute convex lens arrangement.

As will be described later, the minute convex lens arrangement has "a plurality of minute convex lenses (microlenses) that are closely arranged at a pitch close to the pitch of pixels". In other words, the to-be-scanned surface 8 is a microlens array.

In the present example embodiment, the multiple minute convex lenses are two-dimensionally arranged at a prescribed pitch along an assumed plane parallel with the X-axis direction such that each of the convex surfaces of the minute convex lenses becomes an incidence plane. More specifically, the minute convex lenses may be arranged, for example, in a honeycomb array (zigzag array) or in a matrix (two-dimensional grid pattern) where the X-axis direction is set to the row direction and the direction orthogonal to the X-axis direction in the assumed plane is set to the column direction.

The planar shape of the minute convex lenses may be, for example, a circle, a regular triangle, a square, or other regular shapes with a greater number of angles. In the present example embodiment, it is assumed that the minute convex lenses have equal curvature (radius of curvature).

Each of the minute convex lenses isotropically diffuses the pixel displaying beam LC. In other words, each of the minute convex lenses has omnidirectionaly even diffusing power. Such "diffusing function" is briefly described below.

Figure 1C:
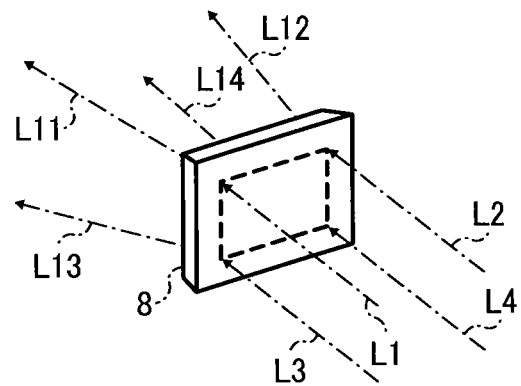

FIG. 1C illustrates four pixel displaying beams L1 to L4 that enter the to-be-scanned surface 8, according to the present example embodiment.

The four pixel displaying beams L1 to L4 enter the to-be-scanned surface 8 at the four corners of the two-dimensional image formed on the to-be-scanned surface 8.

As the four pixel displaying beams L1 to L4 passes through the to-be-scanned surface 8, the pixel displaying beams L1 to L4 are converted into beams L11 to L14.

Assuming that a laser-beam bundle whose cross section is a horizontally oriented quadrangle surrounded by the pixel displaying beams L1 to L4 enters the to-be-scanned surface 8, such a laser-beam bundle becomes a "divergent laser-beam bundle whose cross section is a horizontally-oriented quadrangle surrounded by the beams L11 to L14".

The function of the minute convex lenses as described above is referred to as the "diffusing function".

The "divergent laser-beam bundle whose cross section is a horizontally-oriented quadrangle surrounded by the beams L11 to L14" is obtained by temporally collecting the pixel displaying beam that has been converted into a divergent laser-beam bundle as described above.

The pixel displaying beam is diffused such that "the laser-beam bundle reflected at the front windshield 10 irradiates a wider area in the proximity of the observer 11".

When the diffusing function described above is not available, the laser-beam bundle reflected at the front windshield 10 irradiates only a "small area in the proximity of the observer 11".

For this reason, when the observer 11 moves his/her head and the position of the eyes deviates from the "small area", the observer 11 can no longer visually recognize the magnified virtual image 12.

By diffusing the pixel displaying beam as described above, the laser-beam bundle reflected at the front windshield 10 irradiates a "wide area in the proximity of the observer 11".

Accordingly, even if the observer 11 "slightly moves his/her head", the observer can visually recognize the magnified virtual image 12 with reliability.

The HUD as described above may be provided, for example, for a vehicle such as a car, and the X-axis direction and the Y-axis direction indicate "the right and left directions with reference to a driver's seat" and "the up-and-down directions with reference to the driver's seat", respectively.

According to the present example embodiment, for example, a "navigation image" can be displayed ahead of the front windshield of a car or the like as the magnified virtual image 12, and a driver as the observer 11 can observe such a navigation image without moving his/her line of vision away from the ahead of the windshield while staying in the driver's seat.

In such an embodiment, it is desired that the magnified virtual image be a "horizontally-oriented image when seen from a driver", as described above. In other words, it is desired that the image formed on a microlens and the magnified virtual image be an image whose angles of view is wider in the X-axis direction.

It is also desired that "the viewing angle be wider in the lateral direction than in the vertical direction" such that a driver as the observer can recognize the displayed image even in a slanting direction from the right and left sides.

For this reason, a greater diffusion angle (anisotropic diffusion) is required for the longer-side direction (i.e., X-axis direction) of the magnified virtual image, with reference to the shorter-side direction (i.e., Y-axis direction) of the magnified virtual image.

Accordingly, it is desired that the minute convex lenses of the to-be-scanned surface 8 be anamorphic lenses whose curvature is greater in the longer-side direction than in the shorter-side direction of an image formed on a microlens or a magnified virtual image, and that the diffusion angle of the pixel displaying beam be "wider in the lateral direction than in the vertical direction of a two-dimensional image".

As described above, according to the example embodiment of the present invention, the utilization efficiency of light and the brightness of display image can be improved as the light is dispersed to a minimum area that satisfies the desired angle of view of a HUD.

As a matter of course, "isotropic diffusion" in which the diffusion angle is equal between the lateral direction and the vertical direction may be applied instead of the "anisotropic diffusion" described above.

However, as long as a vehicle-installed HUD for a car or the like is concerned, there are few cases in which the driver observes a displayed image from up-and-down directions.

Accordingly, as long as a vehicle-installed HUD is concerned, it is desired that the diffusion angle of the pixel displaying beam be "wider in the lateral direction than in the vertical direction of a two-dimensional image" as described above in view of the utilization efficiency of light.

Conventionally, it is known that the surface of a minute convex lens (microlens) can be formed as "aspherical surface".

The anamorphic lens has "aspherical surface", and the use of such an anamorphic lens enables the aspherical surface of a minute convex lens as desired. Moreover, the use of the anamorphic lens can perform aberration correction.

Due to the aberration correction, "nonuniformity in diffusion intensity" may be reduced.

The application of the HUD according to the example embodiment of the present invention is not limited to a car as described above, but the HUD may be applied to various kinds of operable mobile objects such as trains, ships, helicopters, and aircrafts.

As a matter of course, the HUD according to the present example embodiment may be implemented, for example, as a "image display apparatus for movie viewing".

The minute convex lenses in the minute convex lens arrangement diffuse the pixel displaying beam as described above, but may diffuse the pixel displaying beam only in a single direction between the X-axis direction and the Y-axis direction.

In such cases where diffusion is performed only in a single direction, "minute convex cylinder surface" may be applied to the lens surface of the minute convex lenses.

The shape of the minute convex lens may be shaped as a hexagon, and the minute convex lenses may be arranged like a honeycomb. Such variations are conventionally known in the art of microlens array manufacturing method.

The market expectations for the HUD as the image display apparatus 1000 described above are running high as application by which a driver can recognize an alert or other kinds of information with a little movement of his/her line of sight. In recent years, the technology development of HUDs for vehicles (for example, cars, motorbikes, trains) are advancing in particular.

The HUDs are broadly divided into a windshield projection type in which the light that forms the image is projected towards the windshield and a combiner projection type in which the light that forms the image is projected towards a transmission and reflection member (combiner). In view of the interior design of a vehicle or discomfort caused by an obstructing combiner, HUDs of the front-windshield projection type are preferred.

As known in the art, a HUD of the front-windshield projection type is integrated into the dashboard of a vehicle, and serves as a module (image display apparatus) that reflects an intermediate image formed inside the dashboard to the front windshield using a mirror or the like to display the magnified virtual image 12 with certain distance from the viewpoint of the observer 11. The observer 11 may be referred to as the driver 11 in the following description. Note that the viewpoint of the observer 11 merely indicates a reference position (reference eye point). It is assumed that the range of the viewpoint of the observer 11 is equal to or less than the eye range of car driver (JIS D 0021).

The demands for HUDs in the market are summarized in the following two points.—Downsizing—Stress-free visual recognition In regard to the "downsizing", a size is desired that does not interfere the ducts, meters, and defroster stored in the dashboard, and the body structure. This is because changes in the position of ducts, meters, and defroster or the changes in body structure due to the installation of a HUD lead to reduction in air-conditioner performance, defroster performance, and the body strength of the car.

In regard to the "stress-free visual recognition", stress-free graphic is desired for the environment of a driver because a HUD displays graphics around his/her sight at all times. If the graphics lacks "instant readability", for example, when the information is hard to read or the information is deformed and awkward, the HUD that serves as an information display apparatus (image display apparatus) may become an impairing factor for the sight of the driver.

As the projection method of HUD, a "panel system" in which an intermediate image is formed by an imaging device such as a liquid crystal panel or digital micromirror device (DMD) panel, or a "optical scanning system" in which an intermediate image is formed by performing two-dimensional optical scanning on a to-be-scanned surface are known in the art.

In particular, the "optical scanning system" is advantageous in achieving "Downsizing" and "Stress-free visual recognition" because an intermediate image can be formed by optical design without being influenced by the performance of the installed imaging device.

In the conventional HUD of the front-windshield projection type, an area of the front windshield that the light that forms an intermediate image enters is bent asymmetrically in the right and left directions and thus optical deformation is asymmetrically caused on the virtual image. An attempt to correct such optical deformation by the design of the projection optical system (i.e., the optical system that guides the light that has passed through a to-be-scanned surface to the front windshield) typically leads to an increase in the number of the optical elements in the projection optical system, and such an increase affect the "Downsizing".

In detail, as illustrated in FIG. 2 for example, the front windshield 10 is gradually bent backward from a center position 111y of the right and left directions of the vehicle (X-axis direction) to the door side on the right (on +X side), and an upper portion of the front windshield 10 in the up-and-down directions of the vehicle (Y-axis direction) is obliquely bent backward (on +Y side).

In other words, the front windshield 10 is an aspherical transmission and reflection member that is asymmetrically bent backward (where a right portion of the front windshield is bent backward to a greater degree) with reference to a center position 110y in the right and left directions corresponding to the driver's seat of the vehicle, and an upper portion of the front windshield 10 in the up-and-down directions of the vehicle is obliquely bent backward.

The light that has passed through the to-be-scanned surface 8 and the concave mirror 9 enters the incidence area of the front windshield 10 (on −Z side), and the light that is reflected at the incidence area enters the eyes of the driver 11. As a result, the driver 11 can visually recognize the magnified virtual image 12 (see FIG. 2). However, the incidence area is also asymmetrically bent backward (where a right portion of the windshield is bent backward to a greater degree), and an upper portion of the incidence area in the up-and-down directions of the vehicle is obliquely bent backward. More specifically, the front windshield 10 is gradually bent so as to be oblique to the Y-axis direction and convex towards the +Y side. Note that the center of the incidence area and the center of the magnified virtual image 12 in the X-axis direction coincide with the center position 110y.

Accordingly, when an image whose longer-side direction is parallel to the X-axis direction is formed on the to-be-scanned surface 8, deformation may be caused on the virtual image to be visually recognized by the driver 11 due to the horizontally-asymmetrical shape of the incidence area.

Moreover, when an image parallel to the XY plane is formed on the to-be-scanned surface 8 upon arranging the to-be-scanned surface 8 parallel to the XY plane, deformation may be caused on the virtual image to be visually recognized by the driver 11 due to the bent shape of the incidence area.

The deformation as described above is caused to a greater degree when the magnifying power of the image (i.e., intermediate image), in particular, the magnifying power of the projection optical system, is large and the virtual image is large in the HUD.

Here, the deformation on the virtual image when a HUD of the front-windshield projection type whose projection optical system has the only one concave mirror 9 is installed in a vehicle with right-side steering wheel is described. For the purpose of simplification, it is assumed in the present example embodiment that a reflection plane of the concave mirror 9 is planar and the front windshield 10 is shaped like a flat plate.

Figure 4:
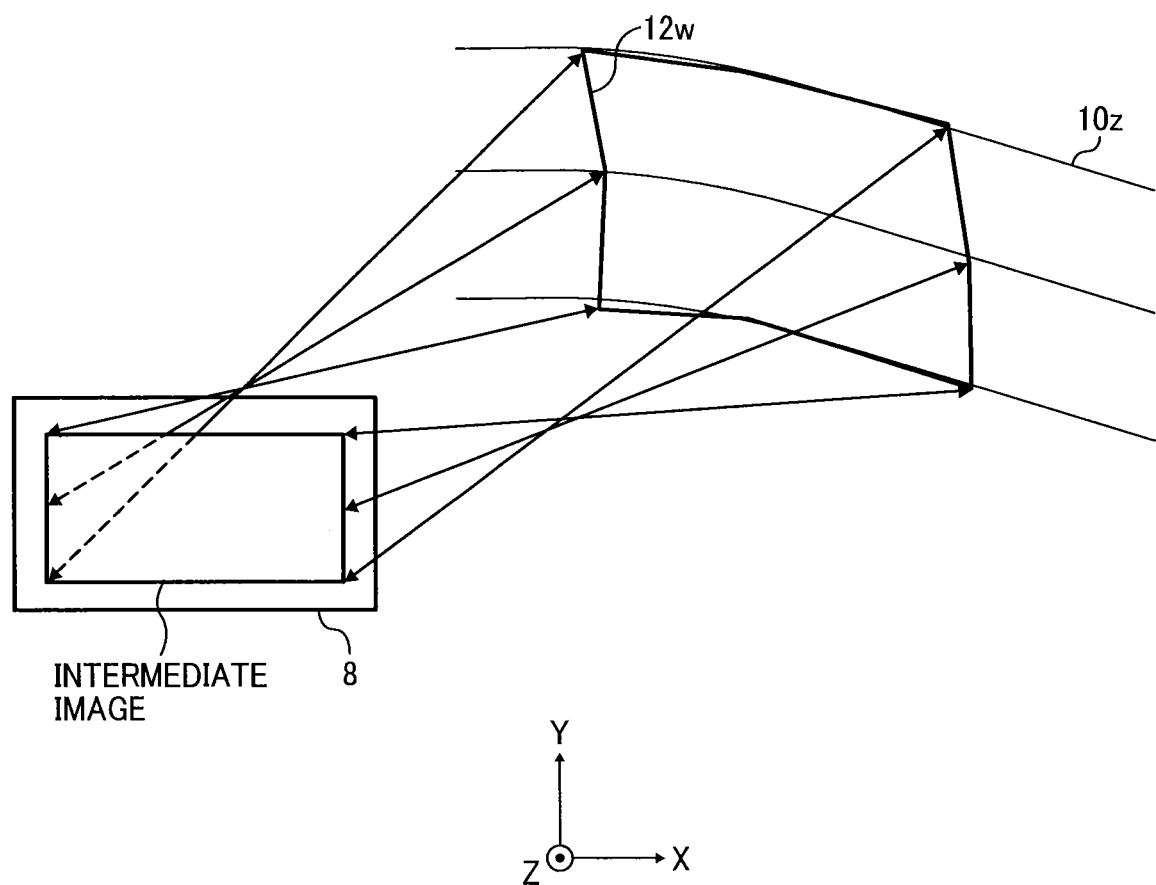
FIG. 4 illustrates an image display apparatus according to an example embodiment of the present invention.

FIG. 4 illustrates a state in which an image (intermediate image) whose longer-side direction is parallel to the horizontal plane (i.e., XZ plane) is formed on the to-be-scanned surface 8 and the points of the to-be-scanned surface are projected onto the front windshield 10.

As described above, the front windshield 10 is a transmission and reflection member that is convex in the +Y direction. Accordingly, when depth lines 10z are plotted on the front windshield 10 in the Z-axis direction (i.e., the forward and backward directions of the vehicle), such depth lines 10z are gradually oblique to the door side on the right (i.e., +X side).

In such cases, the incidence area of the front windshield 10 becomes as indicated by the reference sign "12w" in FIG. 4. Note that as the projection optical system has the only one concave mirror 9, the relative positions of the surface are inverted in the vertical direction due to the projection from the concave mirror 9 to the front windshield 10 (see FIG. 1A).

Due to the gradually-oblique shape of the windshield 10 as described above, a deformed mode is present in which, for example, the incidence area of the front windshield 10 as indicated by the reference sign 12w is "oblique to the door side" or "deformed as distant from the center line of the vehicle", as a factor in optical deformation in which the shape of the front windshield 10 on the driver's seat side (i.e., right side) is reflected.

Figure 3:
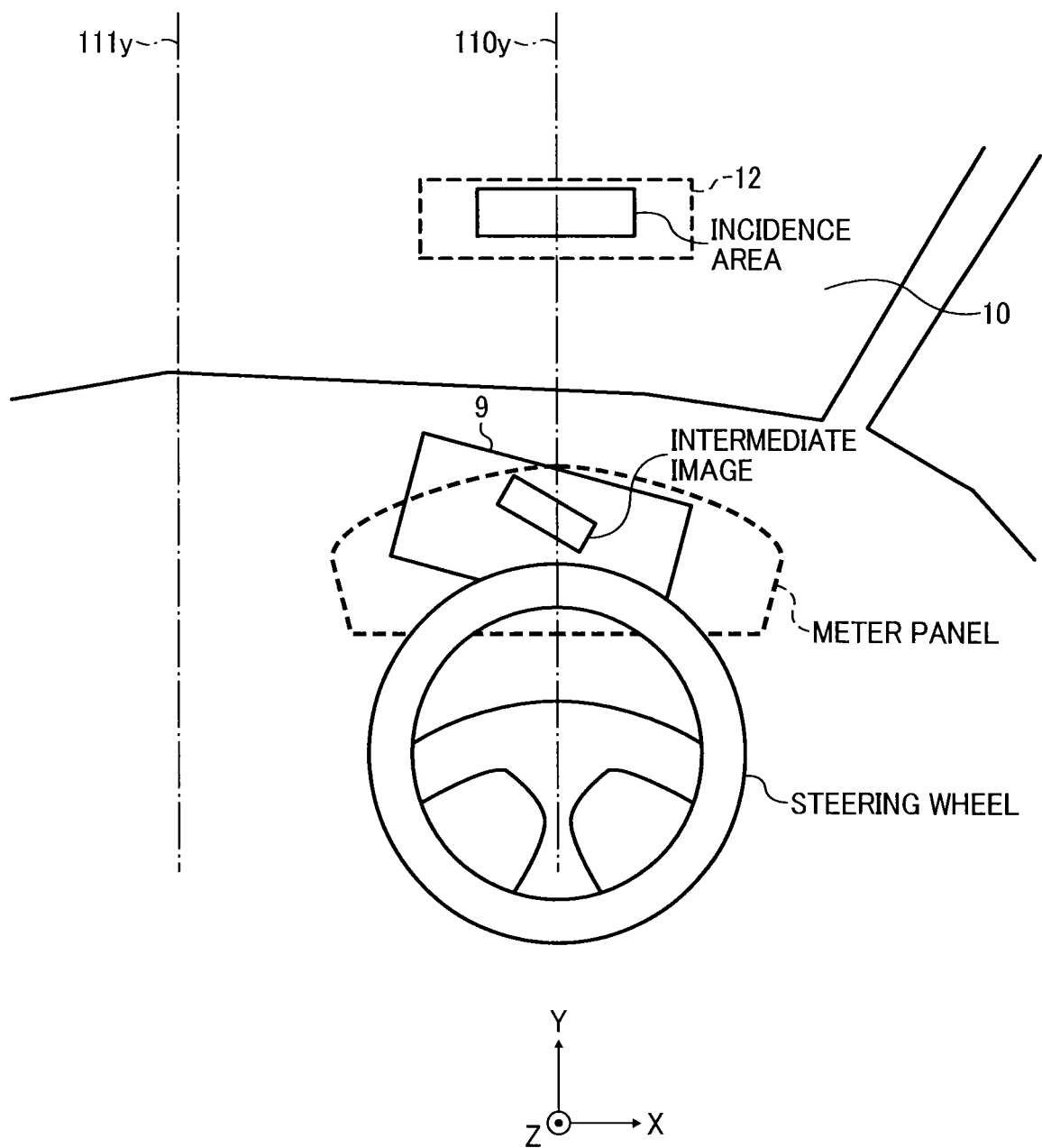
FIG. 3 illustrates an image display apparatus according to an example embodiment of the present invention.

In the present example embodiment, such a deformed mode is dealt with as follows, as illustrated in FIG. 3. The longer-side direction of the image (intermediate image) that is formed on the to-be-scanned surface 8 is made oblique to the XZ plane (i.e., the assumed plane orthogonal to the up-and-down directions of the vehicle).

More specifically, the longer-side direction of the image that is formed on the to-be-scanned surface 8 is made oblique so as to be lower in the +X-axis direction (i.e., to the door side of the vehicle) with reference to the X-axis direction (i.e., the right and left directions of the vehicle) when viewed from the Z-axis direction (i.e., the forward and backward directions of the vehicle). In other words, the image that is formed on the to-be-scanned surface 8 is made oblique so as to be lower (oblique towards the −Y side) in the +X-axis direction with reference to the Z-axis direction.

Figure 5A:
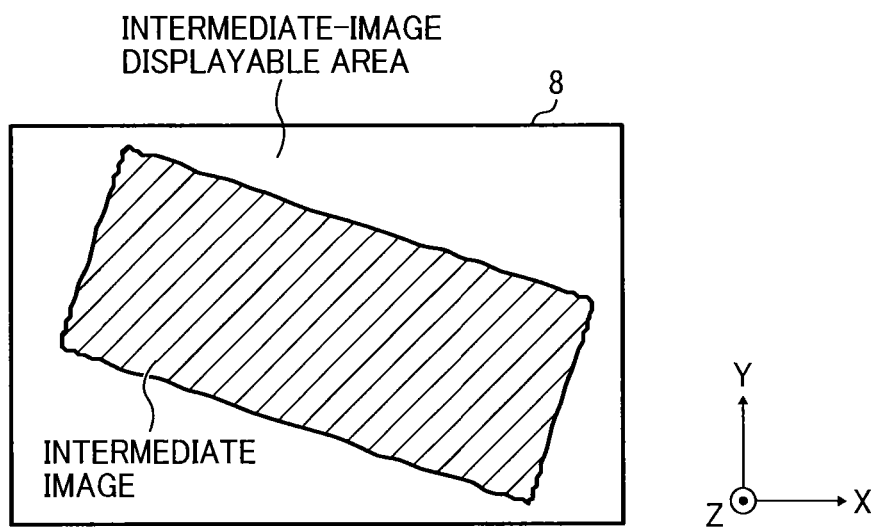
FIG. 5A and FIG. 5B are illustrations of the formation of an intermediate image on a to-be-scanned surface, according to an example embodiment of the present invention.
Figure 5B:
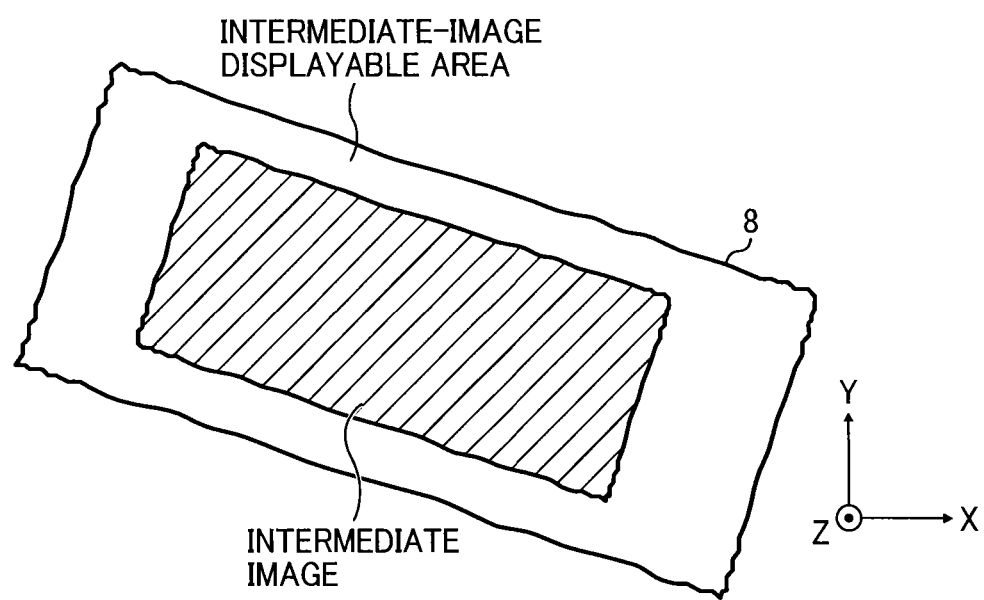

When the intermediate image is made oblique, as illustrated in FIG. 5A, only the intermediate image may be made oblique without making the to-be-scanned surface 8 oblique. Alternatively, as illustrated in FIG. 5B, the to-be-scanned surface 8 may be made oblique together with the intermediate image.

When the intermediate image is made oblique, the intermediate image may be formed by performing two-dimensional scanning where the X-axis direction is the main-scanning direction, according to, for example, the image data obtained by making the original image data oblique. Alternatively, the intermediate image may be formed by performing two-dimensional scanning where the direction oblique to the X-axis direction is the main-scanning direction, according to the original image data.

Note that when the X-axis direction is the main-scanning direction, the pivot that corresponds to the main-scanning direction of the two-dimensional deflector 6 is to be made parallel to the Y-axis. When the direction oblique to the X-axis direction is the main-scanning direction, the pivot that corresponds to the main-scanning direction of the two-dimensional deflector 6 is to be made oblique to the Y-axis.

Figure 6:
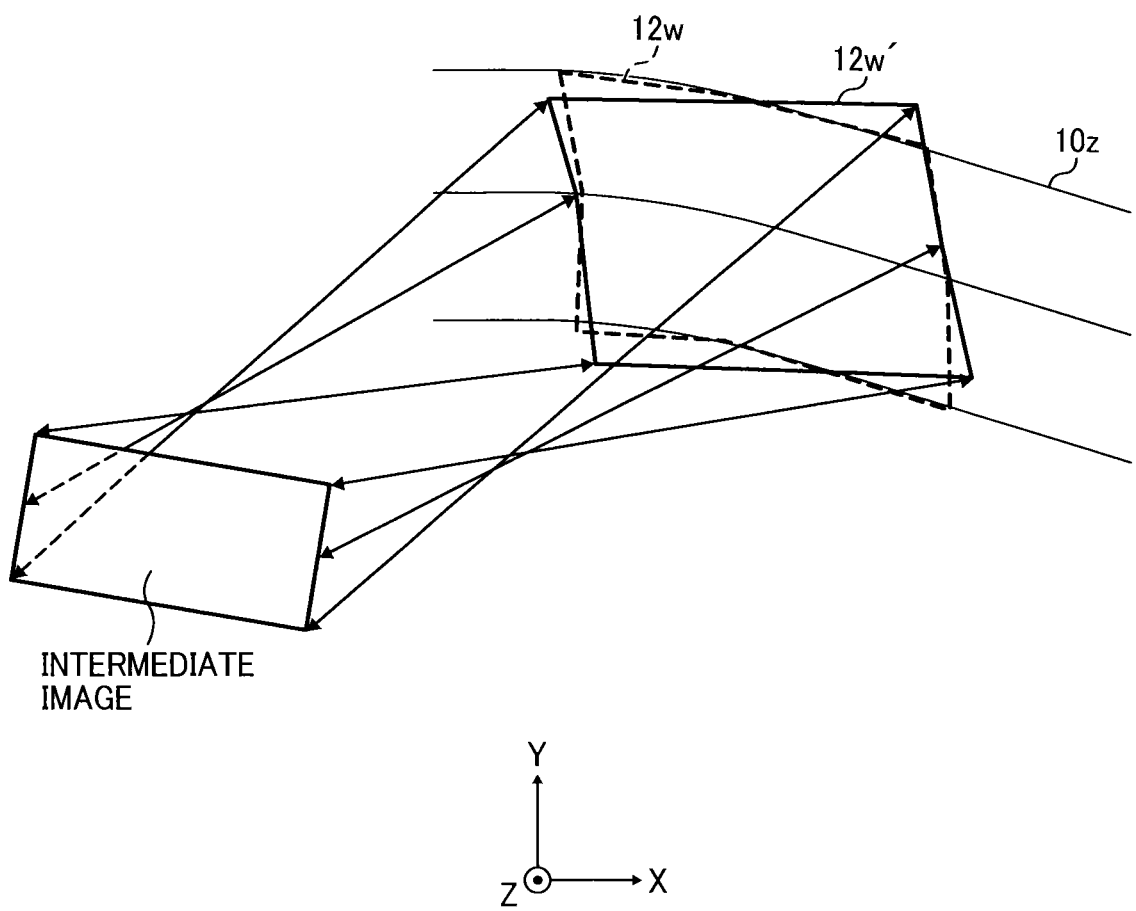
FIG. 6 illustrates an effect obtained by making an intermediate image oblique, according to an example embodiment of the present invention.

As described above, the inclination of the depth line 10z of the front windshield 10 can be corrected by making the intermediate image oblique with reference to the X-axis direction. More specifically, the incidence area of the front windshield 10 that is viewed from the driver 11 can be corrected from the area indicated by the broken lines 12w to the area indicated by a solid line 12w' (see FIG. 6). As a result, the deformation of the virtual image due to the horizontally-asymmetrical bent shape of the incidence area of the front windshield 10 may be reduced.

Note that in the present example embodiment, it is assumed that the reflection plane of the concave mirror 9 is planar and the front windshield 10 is shaped like a flat plate, and the arrangement of the to-be-scanned surface 8 and the concave mirror 9 is not taken into consideration. For this reason, a prescribed oblique direction of the intermediate image is not limited to the examples described above. As the shape of the front windshield varies for each vehicle type, it is desired that the prescribed oblique angle of the intermediate image be determined differently for each vehicle type so as to reduce the deformation of the virtual image as much as possible.

In the present example embodiment, the intermediate image (the to-be-scanned surface 8) and the incident laser-beam bundle (the concave mirror 9) are made oblique to the Y-axis direction with reference to the X-axis direction (see FIG. 1A). The term "incident laser-beam bundle" indicates the laser-beam bundle that enters the reflection plane of the concave mirror 9.

In such cases, the deformation of the virtual image, which is viewed from the X-axis direction, due to the inclination of the incidence area of the front windshield 10 with reference to the Y-axis direction can be attenuated.

The image display apparatus 1000 further includes a virtual image height adjuster 300 to adjust the height of the virtual image according to a driver's physical constitution.

Figure 7:
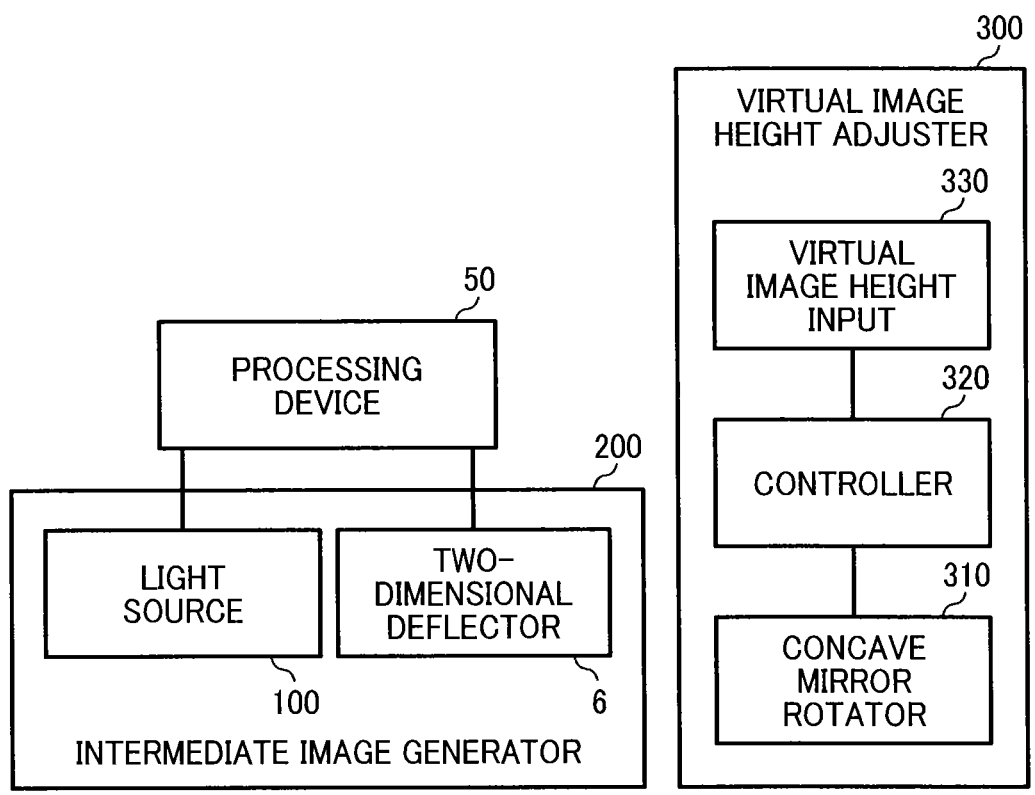
FIG. 7 is a block diagram illustrating configurations of an intermediate image generator and a virtual image height adjuster according to an example embodiment of the present invention.

The virtual image height adjuster 300 includes, as illustrated in FIG. 7, a concave mirror rotator 310 to rotate the concave mirror 9 about a tilt axis, a controller 320 to control the concave mirror rotator 310, and a virtual image height input 330 to input the height of a desired virtual image (virtual image height) to the image controller 320. The controller 320 is implemented by a CPU and a memory such as a ROM or a RAM.

Figure 8A:
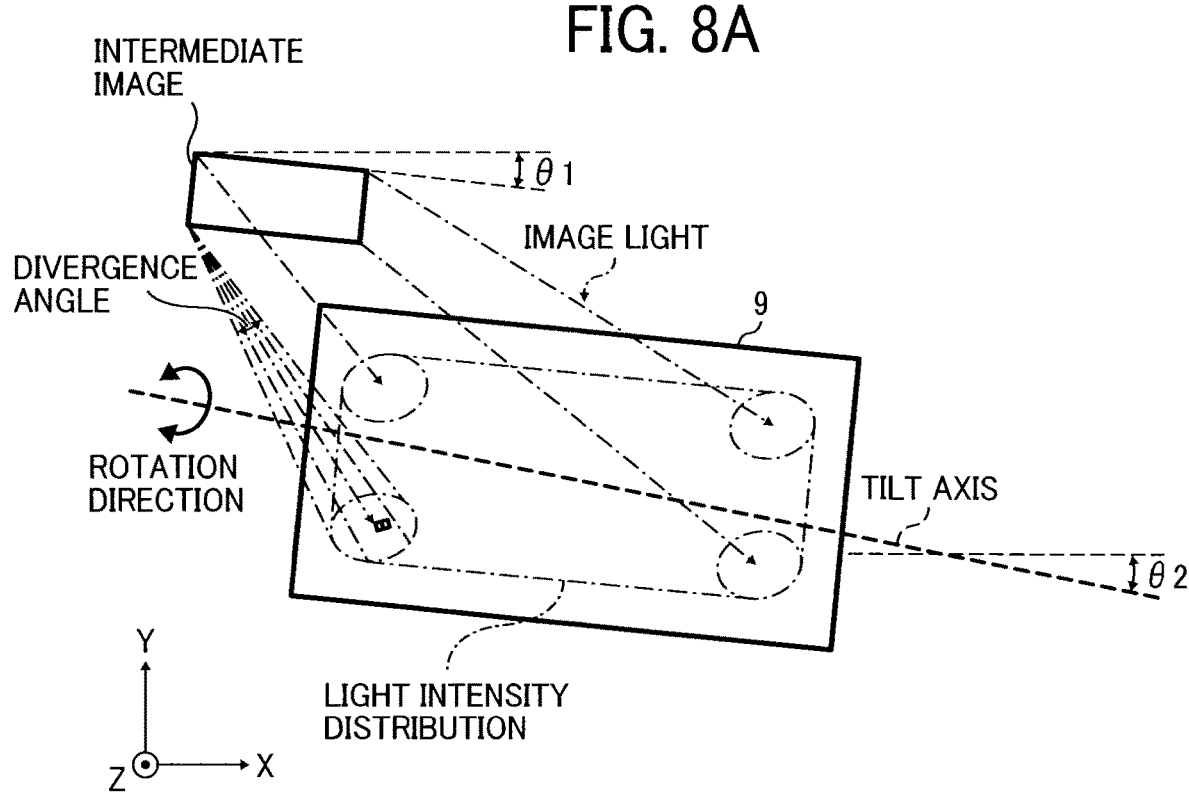
FIG. 8A illustrates an inclination θ1 of a projection image of an intermediate image and an inclination θ2 of a projection image of a tilt axis, according to an example embodiment of the present invention.
Figure 8B:
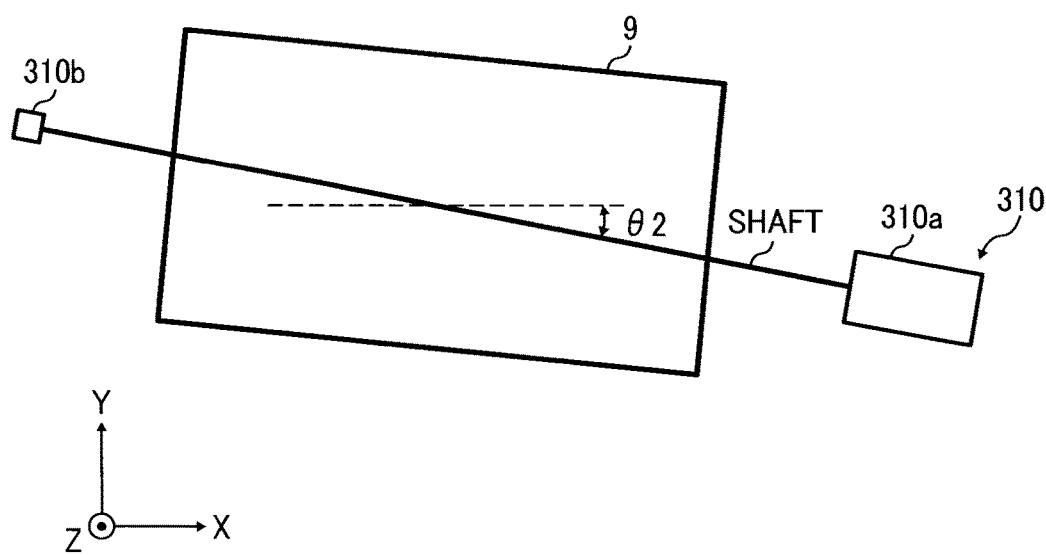
FIG. 8B illustrates a configuration of a concave mirror rotator, according to an example embodiment of the present invention.

The concave mirror rotator 310 includes, for example, a motor 310a having a shaft (rotating shaft) extending in a tilt axis direction and secured to the concave mirror 9, and a bearing 310b that rotatably supports the tip of the shaft (see FIG. 8B). In the present example embodiment, although a stepping motor is used for the motor 310a, other motors (for example, a servo motor) may be used. Furthermore, in the present example embodiment, the shaft of the motor of the concave mirror rotator 310 is directly secured to the concave mirror 9, but may be coupled to the concave mirror 9 through other members (for example, a drive transmitter, such as a gear). More specifically, the concave mirror rotator 310 is configured such that the rotation of the shaft of the motor rotates the concave mirror 9 about the tilt axis.

At the virtual image height input 330, for example, the height of the virtual image (virtual image height) can be selected in stages. When +N (≥1) is input, the height of the virtual image is set N stage higher than the original height. When −N (≥1) is input, the height of the virtual image is set N stage lower than original height.

Thus, a driver inputs a desired virtual image height into the controller 320 with the virtual image height input 330, and then the controller 320 drives the motor 310a so that the height of the virtual image is to be the input height (hereinafter, also referred to as an "input height") to rotate the concave mirror 9 about the tilt axis. The rotation amount (rotation angle) of the concave mirror 9 at this time is equivalent to the difference between the original position of the concave mirror 9 about the tilt axis and the position of the concave mirror 9 about the tilt axis corresponding to the input height.

In the present example embodiment, the virtual image height adjuster 300 adjusts the height of the virtual image according to the driver's input action. Instead of this, for example, the height position of the driver's eyes is detected, and the controller 320 may control (automatically adjust) the concave mirror rotator 310 based on the detection result.

FIG. 8A schematically illustrates the relation between the concave mirror 9, the tilt axis, and the intermediate image. FIG. 8B schematically illustrates the relation between the concave mirror 9, the motor 310a, and the bearing 310b.

Image light emitted from the intermediate image enters the concave mirror 9 at a certain divergence angle. The divergence angle is set so that sufficient image light reaches the area where the viewpoint of the observer can be positioned.

When the divergence angle is set, the height adjustment of the virtual image needs to be taken into consideration. Thus, the concave mirror 9 needs to be considerably larger than the intermediate image. In the present example embodiment, for example, the intermediate image has 57 mm width and 24 mm length, and the concave mirror 9 has 255 mm width and 126 mm length.

In the heads-up display apparatus disclosed in JP-5251853-B and JP-2009-196473-A, for example, an angle θ2 formed with respect to the X direction by the projection image on the XY plane of the tilt axis of the curved mirror to adjust the height of the virtual image is substantially zero. That is, the tilt axis of the curved mirror is substantially horizontal. Hereinafter, a "heads-up display apparatus" is also referred to as a "unit". Furthermore, hereinafter, a "projection image on the XY plane of the tilt axis" is appropriately referred to as a "projection image of the tilt axis".

According to the background heads-up display apparatus, a virtual image size to be displayed has been relatively small, and an intermediate image size and a curved mirror (for example, a concave mirror) have not needed to be large. Accordingly, it has been relatively easy to achieve both visibility and downsizing. Thus, in the cases in which an optical path from the intermediate image to the curved mirror is nearly horizontal (decreased) or in which an optical path length (an optical path length from the intermediate image to the curved mirror) is increased by setting the magnification of the optical system (for example, the curved mirror) low, it has been sufficiently possible to keep a unit within a size capable of being equipped in a mobile object, such as a vehicle, while the visibility is secured.

Here, in order to enlarge a display so as to improve the visibility, the curved mirror needs to be larger.

In this case, in order to downsize the unit, it is necessary to decrease the optical path length from the intermediate image to the curved mirror, that is, to achieve high magnification of the projection optical system.

However, high magnification of the projection optical system easily increases image deformation.

In the present embodiment, as described above, the inclination θ1 of the intermediate image (inclining the projection image on the XY plane of the intermediate image by θ1 with respect to the X direction) decreases the image deformation. Hereinafter, a "projection image on the XY plane of the intermediate image" is appropriately referred to as a "projection image of the intermediate image".

FIG. 9 illustrates a comparative example in which the projection image of the intermediate image is inclined by θ1' with respect to the X direction, and an inclination θ2' of the projection image of the tilt axis with respect to the X direction is substantially zero or |θ2'|<|θ1'|.

In FIG. 9, the "virtual image 1" indicates the position of the virtual image before the height adjustment, and the "virtual image 2" indicates the position after the height adjustment by rotating the concave mirror about the tilt axis and adjusting the height. As illustrated in FIG. 9, the virtual image 2 is positioned obliquely right upward with respect to the virtual image 1. In other words, the virtual image position needs to be adjusted only in the up-and-down directions (here, in the +Y direction), but is shifted in the right and left directions (here, in the +X direction) in the comparative example. The "shift" becomes larger as θ1' and the height adjustment amount of the virtual image are larger.

The state illustrated in FIG. 9 is established if the relation between the virtual image 1 and the virtual image 2 is reversed. In other words, in FIG. 9, the "virtual image 2" can indicate the position of the virtual image before the height adjustment, and the "virtual image 1" can indicate the position of the virtual image after the height adjustment by rotating the concave mirror about the tilt axis and adjusting the height. As illustrated in FIG. 9, the virtual image 1 is positioned obliquely left downward with respect to the virtual image 2. In the comparative example, the virtual image position needs to be adjusted only in the up-and-down directions (here, in the −Y direction), but is shifted in the right and left directions (here, in the −X direction). The "shift" becomes larger as θ1' and the height adjustment amount of the virtual image is larger.

In the comparative example, when the height of the virtual image is adjusted, the virtual image is shifted rightward (in the +X direction) if the height of the virtual image is increased, and the virtual image is shifted leftward (in the −X direction) if the height of the virtual image is decreased. Note that, the position of the virtual image in the right and left directions (in the X direction) is preferably set to a direct front of a driver's viewpoint which is the position the driver can visually recognize without moving his/her line of vision as much as possible while driving.

As described above, in the comparative example, a position shift in the X direction (right and left directions) is caused when the height of the virtual image is adjusted due to the oblique of the projection image of the intermediate image with respect to the X direction.

In this case, since the virtual image is shifted in the right and left directions each time the height of the virtual image is adjusted, the driver who is an observer of the virtual image can feel discomfort or strange.

As a result of the inventor's intensive studies to solve the disadvantage, the inventor found that the position shift in the right and left directions when the height of the virtual image was adjusted was able to be controlled by inclining the projection image of the tilt axis with respect to the X direction by some extent in the same direction as the oblique direction of the projection image of the intermediate image. Thus, the inventor introduced the technical idea into the present embodiment.

Specifically, in the present embodiment, the projection image of the tilt axis (the shaft of the motor 310a) is inclined with respect to the X direction by θ2 in the same direction as the oblique direction of the projection image of the intermediate image, and the angles are to establish |θ2|≥|θ1| as illustrated in FIG. 8A and FIG. 8B. In other words, the projection image of the tilt axis is inclined right downward similarly to the projection image of the intermediate image by a larger angle than that of the projection image.

In this case, it is possible to control the position shift in the X direction (hereinafter, also referred to as a "lateral shift") when the height of the virtual image is adjusted.

In view of controlling the position shift in the X direction as much as possible, it is preferable that θ2 is to become larger as θ1 is larger, conversely, that θ2 is to become smaller as θ1 is smaller. However, the correction is insufficient when the difference between θ1 and θ2 is too small, and the correction is excessive (over correction) when the difference between θ1 and θ2 is too large. In other words, an appropriate range of θ2 is naturally determined with respect to θ1, and an optimal θ2 is uniquely determined with respect to θ1.

As a modification example which is another method for controlling the position shift in the X direction when the height of the virtual image is adjusted, the processing device 50 can perform the position correction of the intermediate image. In the modification example, the controller 320 is communicably connected to the processing device 50. The controller 320 transmits, when acquiring an input height from the virtual image height input 330, the input height to the processing device 50.

Figure 10A:
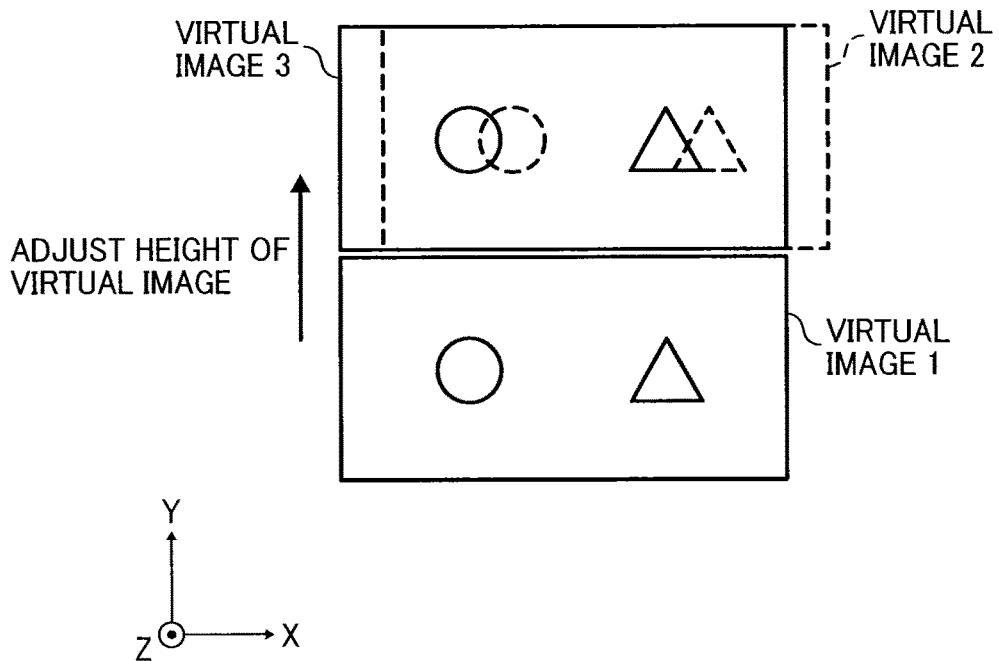
FIG. 10A and FIG. 10B each illustrate position correction when the height of a virtual image is adjusted in a modification example.

Specifically, as illustrated in FIG. 10A, although the virtual image 1 is to be adjusted to the virtual image 2 due to the oblique of the projection image of the intermediate image in the X direction when the height of the virtual image is adjusted (here, when the height is increased) in the comparative example, the processing device 50 corrects the position of the intermediate image on the to-be-scanned surface 8 with a first correction method by image processing or with a second correction method by the control of the two-dimensional deflector 6 so that the virtual image 1 is to be adjusted to the virtual image 3 (immediately above the virtual image 1) in the present embodiment.

Figure 10B:
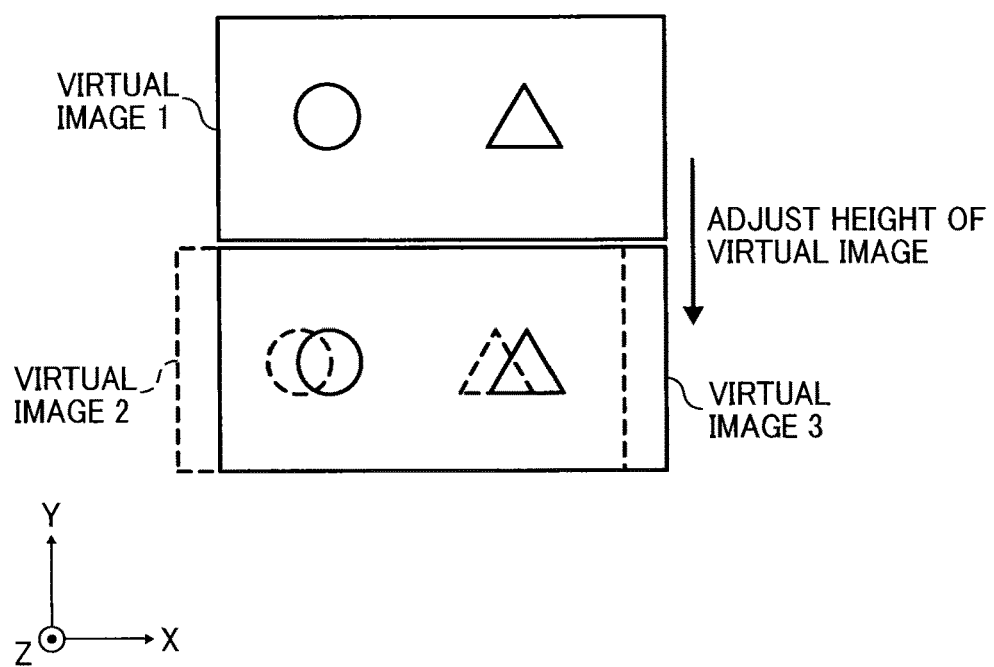

As also illustrated in FIG. 10B, although the virtual image 1 is to be adjusted to the virtual image 2 due to the oblique of the projection image of the intermediate image in the X direction when the height of the virtual image is adjusted (here, when the height is decreased) in the comparative example, the processing device 50 corrects the position of the intermediate image on the to-be-scanned surface 8 with the first correction method by image processing or with the second correction method by the control of the two-dimensional deflector 6 so that the virtual image 1 is to be adjusted to the virtual image 3 (immediately under the virtual image 1) in the present embodiment.

To be more specific, in the first correction method, the processing device 50 calculates, based on the height of the virtual image transmitted from the controller 320, a position correction direction (left or right) and a position correction amount of the virtual image, adjusts the position in the right or left direction within a frame of the image data by the image processing. Then, the processing device 50 controls, based on the image data after the adjustment, the light source 100 and the two-dimensional deflector 6, and thus corrects the position of the intermediate image on the to-be-scanned surface 8. The height adjustment direction and the height adjustment amount of the virtual image can be calculated by comparing the input height of the virtual image transmitted from the controller 320 with the current height of the virtual image. Based on these, the position correction direction and the position correction amount of the virtual image can be calculated.

In the second correction method, the processing device 50 calculates, based on the height of the virtual image transmitted from the controller 320, a position correction direction (left or right) and a position correction amount of the virtual image. Then, the processing device 50 controls, based on the calculated position correction direction, position correction amount, and the image data, the light source 100 and the two-dimensional deflector 6, and thus correcs the position of the intermediate image on the to-be-scanned surface 8.

In both cases of the first and second correction methods, the processing device 50 forms the intermediate image at the position shifted in the direction opposite to the direction in which the virtual image is shifted due to the height adjustment of the virtual image on the to-be-scanned surface 8. At this time, it is preferable that the position correction amount of the intermediate image is set according to the height adjustment amount of the virtual image. In other words, since the position shift in the X direction when the height of the virtual image is adjusted becomes larger as the height adjustment amount of the virtual image (the difference between the original height and the input height) is larger, the position correction amount preferably follows the height adjustment amount.

Alternatively, instead of calculating the position correction amount when the height of the virtual image is adjusted as described above, the corresponding relation of the height adjustment amount, adjustment direction, position correction direction, and position correction amount of the virtual image are tabulated and stored in a medium (for example, a memory, a hard disk, or the like) in advance, and the processing device 50 may perform, referring to the table, the position correction of the virtual image when the height of the virtual image is adjusted.

According to the modification example, it is possible to control the position shift in the X direction when the height of the virtual image is adjusted, and for θ2 to be substantially zero (for the tilt axis to be substantially horizontal), which makes the configuration simplify, and the unit is easily downsized accordingly. Furthermore, the height adjustment amount of the virtual image can follow the position correction amount of the intermediate image, and thus it is possible to more reliably control the lateral shift when the height of the virtual image is adjusted.

However, it is necessary to widen the intermediate image displayable area by the position correction of the intermediate image, and decrease in brightness due to the reduced efficiency is concerned.

It can be appropriately selected to adopt a mechanical system to incline the tilt axis illustrated in FIG. 8A and FIG. 8B (the present embodiment), to adopt a software system to correct the intermediate image position illustrated in FIG. 10A and FIG. 10B (the modification example), or to combine both (the present embodiment and the modification example).

Figure 11A:
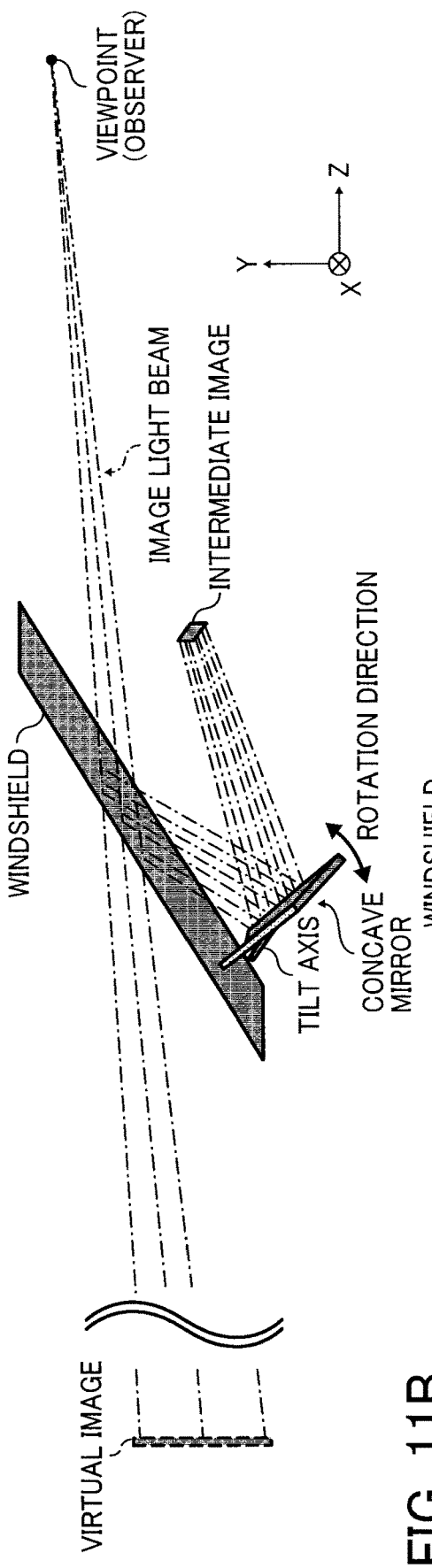
FIG. 11A is an illustration of an optical path from an intermediate image through a concave mirror to a viewpoint viewed from a −X side, according to a first embodiment of the present invention.
Figure 11B:
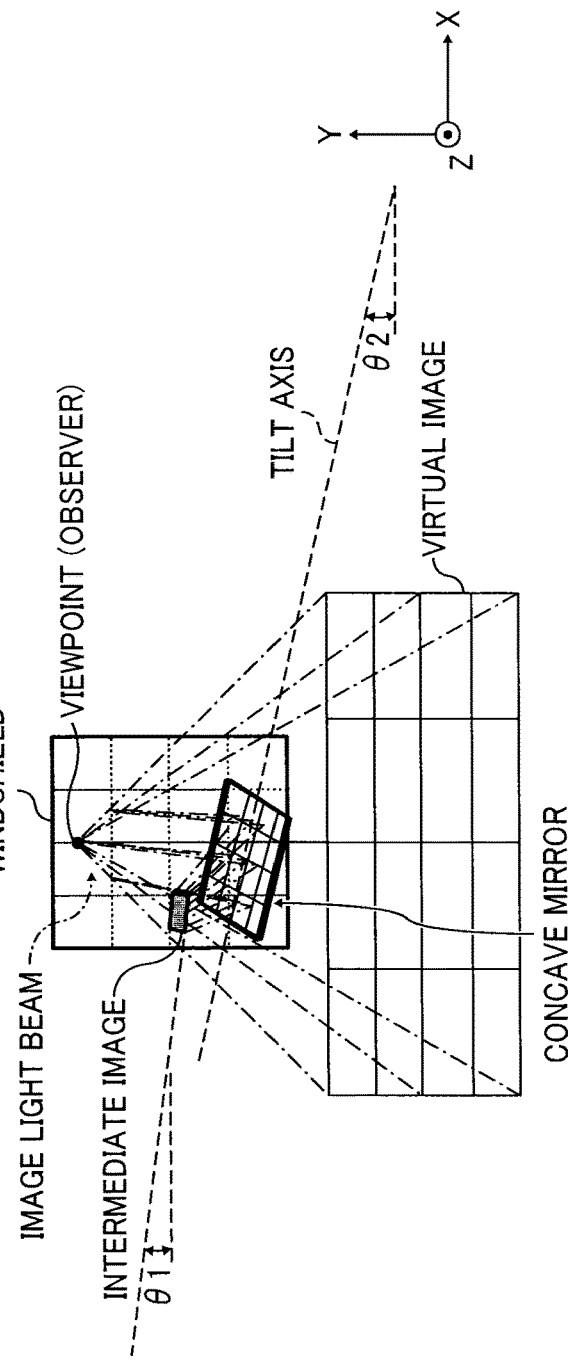
FIG. 11B is an illustration of an optical path from an intermediate image through a concave mirror to a viewpoint viewed from a +Z side, according to the first embodiment of the present invention.

FIG. 11A is an illustration of ab optical path after an intermediate image in a first embodiment of the present embodiment viewed from the −X side, and FIG. 11B is an illustration of the optical path after the intermediate image in the first embodiment of the present embodiment viewed from the +Z side.

In the first embodiment, it is assumed that a horizontal viewing angle of a virtual image is 8°, and a vertical viewing angle is 3°. The virtual image display distance is 6 m away from a viewpoint position. The virtual image has 838 mm width and 314 mm length. Since the intermediate image has 57 mm width and 24 mm length, a magnification which is the ratio of the sizes of the virtual image and the intermediate image is about 14.7 times in a lateral direction and about 13.1 times in a vertical direction. The reason the magnification differs in in the lateral direction and the vertical direction is because that the optical system including a front windshield and a concave mirror is a rotationally asymmetric eccentric optical system.

In order to simplify and downsize the projection optical system, it is possible to control deterioration in image quality, such as deformation and parallax, in designs for a concave mirror shape by actively causing the magnification difference. The difference of the magnification is corrected by changing the aspect ratio of the intermediate image, and thus a desired virtual image shape can be obtained.

Here, when it is assumed that the projection optical system has, for example, a large display and a high magnification of more than 10, it is difficult to design a thin optical system illustrated in, for example, FIG. 2 of JP-2009-196473-A in which an optical path from an intermediate image to a curved mirror is kept within a same plane. This is because that reduction of deformation of a virtual image becomes a major disadvantage, and it is required to design a thin optical system utilizing a degree of freedom of an intermediate image position or an angle of an optical path. Thus, it is expedient to incline the intermediate image with respect to the X direction by θ1, and to incline the tilt axis with respect to the X direction by θ2. In the first embodiment, it is assumed that θ1=7° and θ2=16°.

Figure 12A:
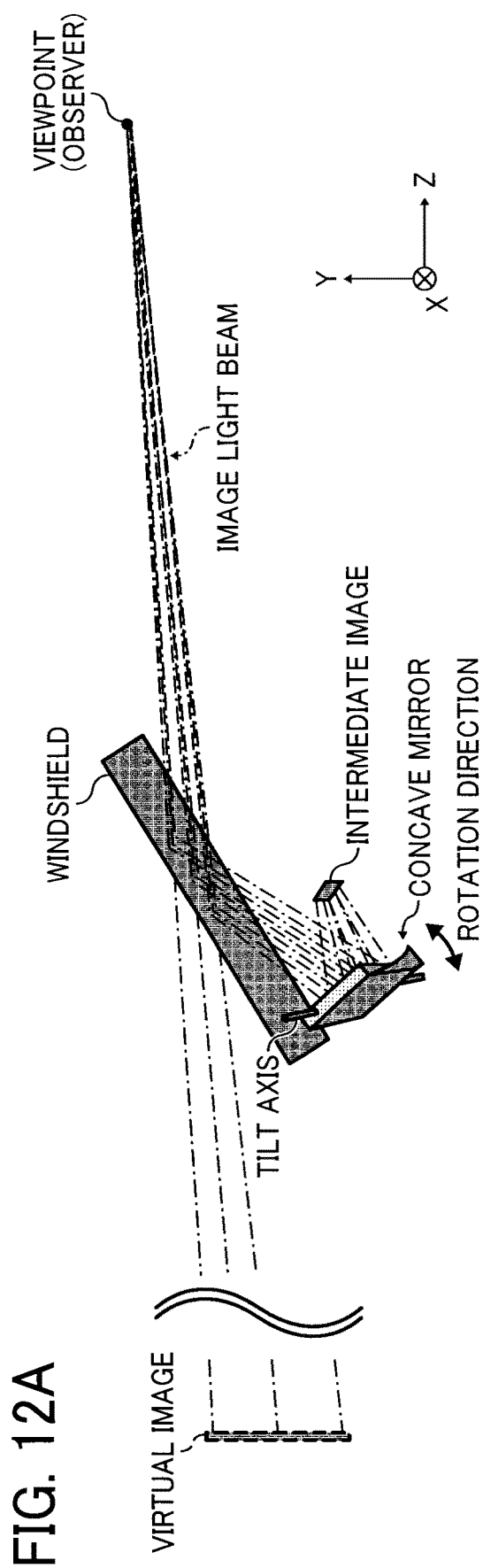
FIG. 12A is an illustration of an optical path from an intermediate image through a concave mirror to a viewpoint viewed from a −X side, according to a second embodiment of the present invention.
Figure 12B:
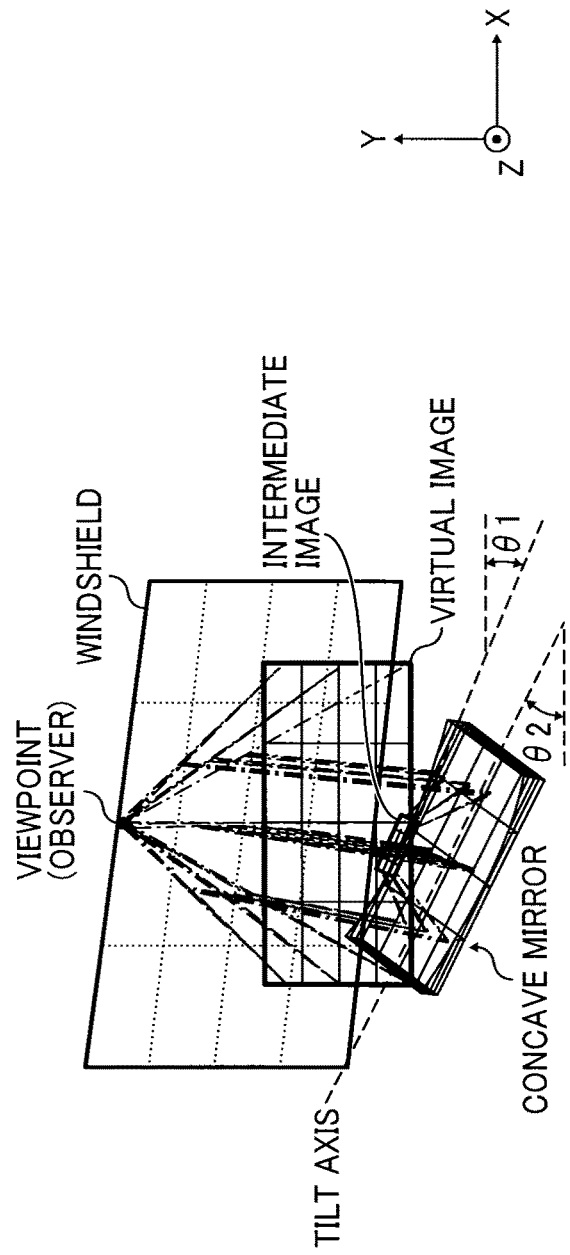
FIG. 12B is an illustration of an optical path from an intermediate image through a concave mirror to a viewpoint viewed from a +Z side, according to the second embodiment of the present invention.

FIG. 12A is an illustration of an optical path after an intermediate image in a second embodiment of the present embodiment viewed from a −X side, and FIG. 12B is an illustration of the optical path after the intermediate image in the second embodiment viewed from a +Z side. In the second embodiment, it is assumed that a horizontal viewing angle of a virtual image is 7° and a vertical viewing angle is 2.5°. The virtual image display distance is 2 m away from a viewpoint position, and the virtual image has 244 mm width and 88 mm length at this time. The intermediate image has 40 mm width and 16 mm length. The magnification which is the ratio of the sizes of the virtual image and the intermediate image is 6.1 times in a lateral direction and 5.5 times in a vertical direction. In the second embodiment, it is assumed that θ1=21° and θ2=27°.

In both of the first and second embodiments, the inventor found that the deformation of the virtual image and the lateral shift when the height of the virtual image is adjusted was able to be sufficiently controlled.

Note that, θ1 and θ2 are not limited to those described in the first and second embodiments, and can be appropriately changed within a range in which the control of the lateral shift when the height of the virtual image is adjusted is effected. For example, θ1 and θ2 can be changed within the range of $5°\leq θ1 \leq 30°$ and $10°\leq θ2 \leq 40°$ respectively. The range of θ1 (5° to 30°) is capable of efficiently controlling the deformation due to a bent shape of a front windshield of a mobile object. The range of θ2 (10° to 40°) is capable of efficiently controlling the lateral shift when the height of the virtual image is adjusted with respect to the range of θ1 (5° to 30°).

Figure 13:
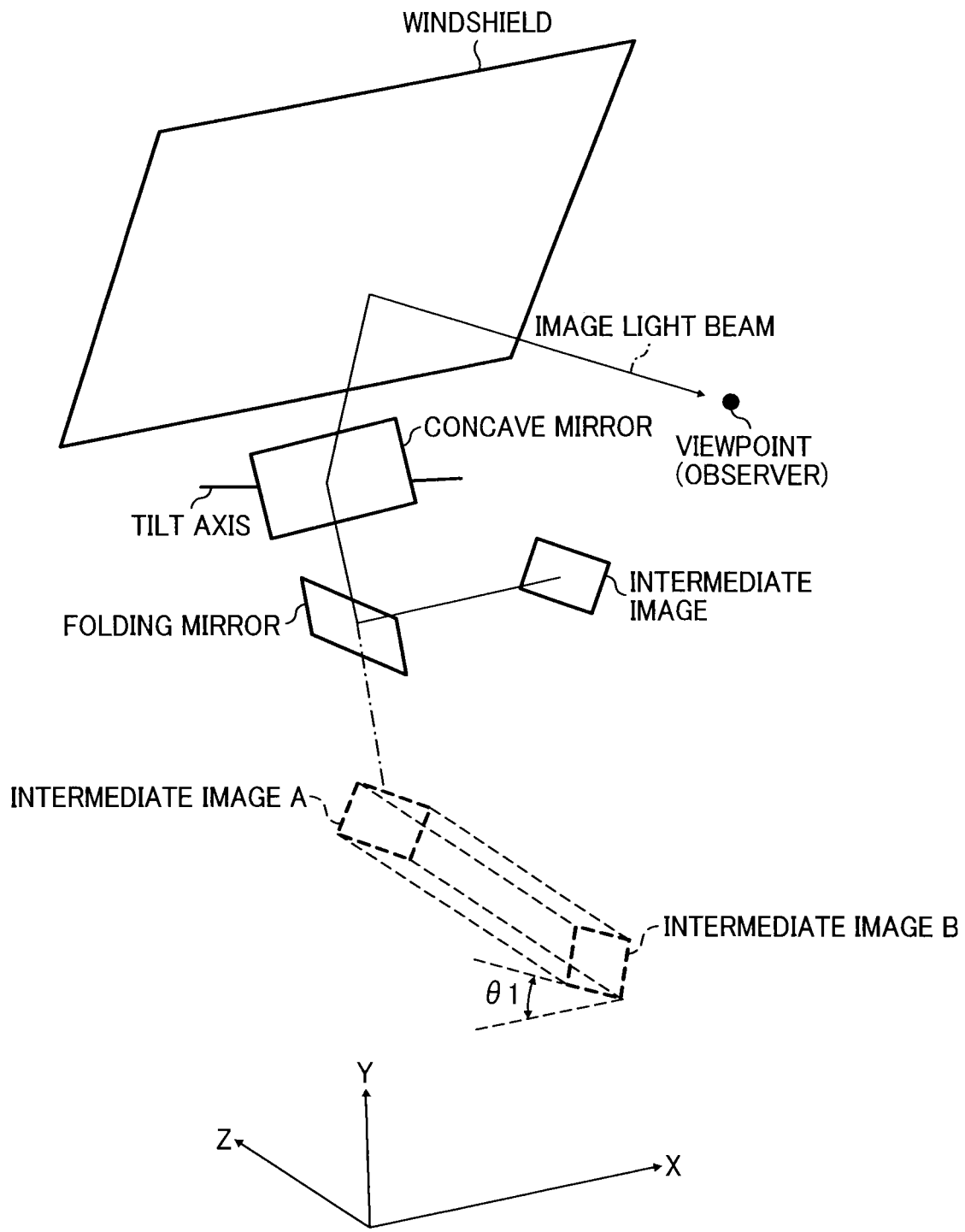
FIG. 13 is an illustration for explaining an inclination angle θ1 of a projection image of an intermediate image according to an example embodiment of the present invention.

As illustrated in FIG. 13, a folding mirror may be arranged between a to-be-scanned surface 8 and a concave mirror 9. In this case, "θ1" is defined as the angle formed, with respect to the X direction, by a projection image (orthogonal projection image) on the XY plane of the intermediate image of the optical path developed by a folding mirror (plane mirror) so as to be equivalent as the optical system. In FIG. 13, the intermediate image "A" is an intermediate image on the optical path developed by the folding mirror, and the intermediate image "B" is an intermediate image projected on the XY plane. As described above, an image, which has conjugate relation with and is optically equivalent to the intermediate image centering the folding mirror, can be used to define θ1.

Figure 14A:
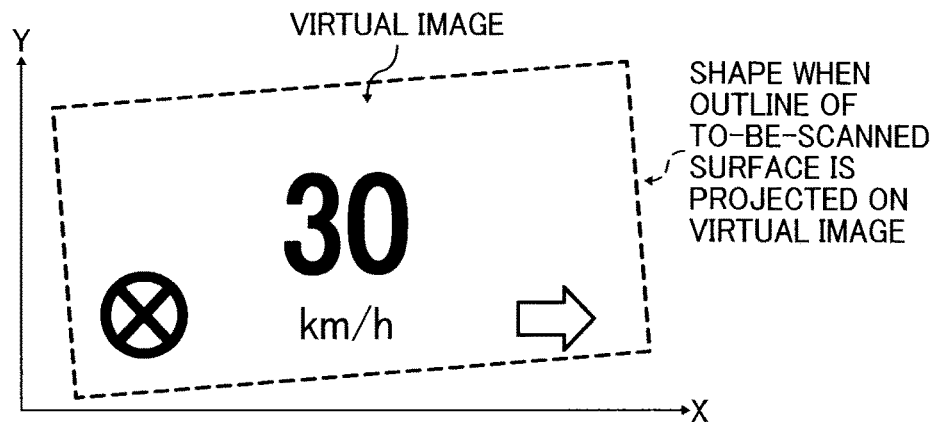
FIGS. 14A and 14B an illustration for explaining an inclination angle θ1 of a projection image of an intermediate image according to an example embodiment of the present invention.
Figure 14B:
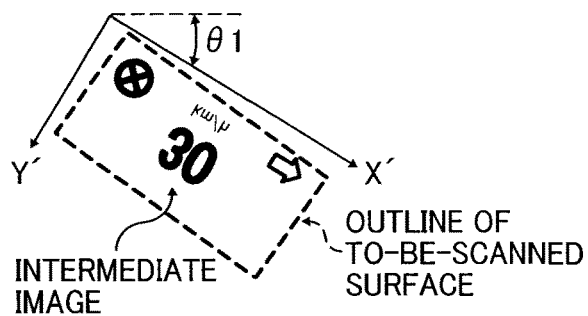

Here, inclination correction of the projection image on the XY plane of the intermediate image in the X direction will be described referring to FIGS. 14A and 14B (FIG. 14). FIG. 14 illustrates the intermediate image formed on the to-be-scanned surface 8 by an intermediate image generator 200 and the virtual image of the intermediate image. More specifically, FIG. 14A illustrates a schematic diagram of a virtual image, and FIG. 14B illustrates a schematic diagram of an intermediate image. The processing device 50 can perform the inclination correction of the intermediate image to the outline of the to-be-scanned surface 8. The reason to perform the inclination correction is because that the virtual image can be inclined due to an error in production when being displayed without the correction. Furthermore, the virtual image can be inclined due to situations of an observer (driver or the like). At this time, the angle θ1 formed by the projection image with respect to the X direction when the intermediate image is projected on the XY plane indicates the angle formed by an X' direction and a Y' direction when the direction corresponding to the X and Y directions of the mobile object in the virtual image and the direction corresponding to the X and Y directions of the mobile object in the intermediate image are an X' direction and a Y' direction respectively.

The above first and second embodiments exemplify an HUD corresponding to the viewpoint from a right side seat, and are based on the assumption of a front windshield shape in front of the viewpoint from the right side seat. To an HUD corresponding to a viewpoint from a left side seat, the coordinate relation of the optical system is right-and-left-mirrors-symmetrically applied.

The above described image display apparatus 1000 (heads-up display) of the present embodiment is an image display apparatus provided for a mobile object in a first view, and includes an intermediate image generator 200 (image forming unit) that forms an intermediate image (image) with light, a projection optical system including a concave mirror 9 that reflects the light forming the intermediate image toward a front windshield 10 (a bent transmission and reflection member), and a rotator 310 that rotates the concave mirror 9 about a tilt axis (prescribed axis), in which a first projection image, which is a projection image on an XY plane of the intermediate image, forms an angle θ1 with respect to an X direction, and a second projection image, which is a projection image on an XY plane of the tilt axis, forms an angle θ2 with respect to the X direction where right and left directions of the mobile object is the X direction and up-and-down directions is a Y direction.

In this case, while controlling an unintentional shift (lateral shift) in the lateral direction when the height of the virtual image is adjusted, it is possible to decrease the distance (optical path length) between the intermediate image generator 200 and the concave mirror 9. Furthermore, while controlling the deformation of the virtual image, it is possible to achieve high magnification of the projection optical system.

As a result, while controlling influence on the display position adjustment function of the virtual image, it is possible to achieve both downsizing and visibility.

The oblique directions of the first and second projection images with respect to the X direction are the same, and it is possible to reliably control the influence on the display position adjustment function of the virtual image.

When $0<|\theta1|<|\theta2|$ is established, it is possible to more reliably control the influence on the display position adjustment function of the virtual image.

When $5°<\theta1<30°$ is established, it is possible to sufficiently control deformation of the virtual image due to a bent shape of a common front windshield.

When $10°<\theta2<40°$ is established, it is possible to sufficiently control the lateral shift when the height of the virtual image is adjusted as long as the range is within $5°<\theta1<30°$ regardless of $\theta1$.

When the image display apparatus 1000 further includes the processing device 50 that adjusts the position of the image in the X direction according to the rotation of the concave mirror 9 about the tilt axis by the rotator 310, it is possible to more reliably control the lateral shift when the height of the virtual image is adjusted regardless of a value of $\theta2$.

Furthermore, the image display apparatus 1000 is an image display apparatus provided for a mobile object in a second view, and includes an intermediate image generator 200 that forms an intermediate image with light, a projection optical system including a concave mirror 9 that reflects the light forming the intermediate image toward a front windshield 10, a rotator 310 that rotates the concave mirror 9 about a tilt axis, and a controller 320 that adjusts the position of the intermediate image, in which the projection image on an XY plane of the intermediate image forms an angle $\theta1$ with respect to an X direction, and the controller 320 adjusts the position of the intermediate image in the X direction according to the rotation of the concave mirror 9 about the tilt axis by the rotator 310, where right and left directions of the mobile object is the X direction and up-and-down directions is a Y direction.

In this case, while controlling an unintentional shift (lateral shift) in the lateral direction when the height of the virtual image is adjusted, it is possible to decrease the distance (optical path length) between the intermediate image generator 200 and the concave mirror 9. Furthermore, while controlling the deformation of the virtual image, it is possible to achieve high magnification of the projection optical system.

As a result, while controlling influence on the display position adjustment function of the virtual image, it is possible to achieve both downsizing and visibility.

In the image display apparatus 1000 in the second view, when the tilt axis forms an angle $\theta2$ with respect to the X direction, it means that the position adjustment of the intermediate image in the X direction has been performed to some extent, and thus it is possible to decrease the position adjustment amount of the intermediate image in the X direction by the controller 320. In this case, it is preferable that $10°<\theta2<40°$ is established.

In the image display apparatus 1000 in the second view, when $0<|\theta2|<|\theta1|$ is established, it is possible to control the lateral shift when the height of the virtual image is adjusted. In other words, regardless of values of $\theta1$ and $\theta2$, it is possible to control the lateral shift when the height of the virtual image is adjusted.

Figure 15:
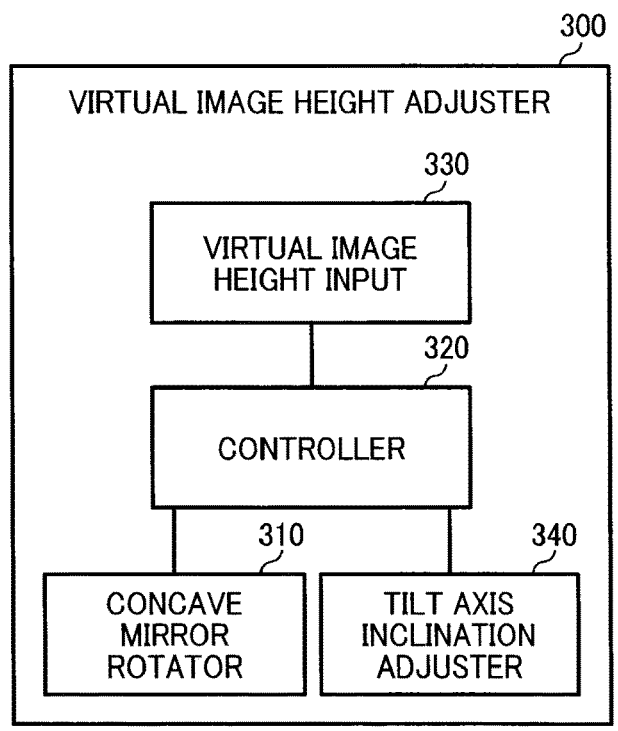
FIG. 15 is a block diagram illustrating a configuration of a virtual image height adjuster including an intermediate image generator and a tilt axis inclination adjuster according to an example embodiment of the present invention.

Note that, the virtual image height adjuster 300 of the image display apparatus 1000 may further includes a tilt axis inclination adjuster 340 to adjust $\theta2$ (the inclination of the projection image on the XY plane of the tilt axis with respect to the X direction) according to the rotation amount (height adjustment amount of the virtual image) of the concave mirror 9 about the tilt axis by the rotator 310 (see FIG. 15). Also in this case, it is possible to more reliably control the lateral shift when the height of the virtual image is adjusted. Specifically, since the lateral shift when the height of the virtual image is adjusted becomes larger as the rotation amount (height adjustment amount of the virtual image) of the concave mirror 9 is larger, it is preferable that $\theta2$ is to be large. The tilt axis inclination adjuster 340 may include, for example, a rotation mechanism that rotates, about the Z-axis, the motor 310a having a shaft extending in the tilt axis direction, and a driving source (for example, a motor) for the rotation mechanism. Note that, the tilt axis inclination adjustment mechanism is not limited to this, and required at least to be capable of adjusting the inclination of the projection image on the XY plane of the tilt axis with respect to the X direction. In order to control the lateral shift when the height of the virtual image is adjusted, the inclination adjustment of the tilt axis needs to be adjusted within a range so as to be the same inclination direction as the inclination direction of the projection image of the intermediate image.

Specifically, the controller 320 calculates, based on the input height of the virtual image, the inclination adjustment amount and the inclination adjustment direction (rotating clockwise or anticlockwise about the Z-axis) of the tilt axis, controls, based on the calculated inclination adjustment amount and inclination adjustment direction, the driving source of the tilt axis inclination adjuster 340, and thus adjusts the inclination of the tilt axis. The height adjustment direction and the height adjustment amount of the virtual image can be calculated based on the input height and the current height (original height) of the virtual image, and based on these, the inclination adjustment amount and the inclination adjustment direction of the tilt axis can be calculated.

Alternatively, the correspondence relation of the height adjustment amount of the virtual image, the height adjustment direction of the virtual image, the inclination adjustment amount of the tilt axis, and the inclination adjustment direction of the tilt axis are acquired, tabulated, and stored in a storage medium (for example, a memory, a hard disk, or the like), and the controller 320 may perform, referring to the table when acquiring the input height of the virtual image, the inclination adjustment of the tilt axis when the height of the virtual image is adjusted.

In other words, the image display apparatus 1000 is an image display apparatus provided for a mobile object in a third view, and includes an intermediate image generator 200 that forms an intermediate image with light, a projection optical system including a concave mirror 9 that reflects the light forming the intermediate image toward a front windshield 10, and a rotator 310 that rotates the concave mirror 9 about a tilt axis, in which a projection image on an XY plane of the intermediate image forms an angle $\theta1$ with respect to an X direction, and the image display apparatus 1000 further includes an adjuster to adjust an angle θ2 formed by the projection image on the XY plane of the tilt axis with respect to the X direction according to the rotation amount of the concave mirror 9 about the tilt axis by the rotator 310, where right and left directions of the mobile object is the X direction and up-and-down directions is a Y direction.

In this case, while controlling an unintentional shift (lateral shift) in the lateral direction when the height of the virtual image is adjusted, it is possible to decrease the distance (optical path length) between the intermediate image generator 200 and the concave mirror 9. Furthermore, while controlling the deformation of the virtual image, it is possible to achieve high magnification of the projection optical system.

As a result, while controlling influence on the display position adjustment function of the virtual image, it is possible to achieve both downsizing and visibility.

In the image display apparatus 1000 in the third view, when 5°<θ1<30° is established, it is possible to control the deformation of the virtual image due to a bent shape of a common front windshield.

In the image display apparatus 1000 in the first to the third views, when X1/X2>Y1/Y2>10 is established where the length of the virtual image of the intermediate image visually recognized through the front windshield in the X direction 10 is X1, the length of the virtual image of the intermediate image in the Y direction is Y1, the length of the intermediate image in the X direction is X2, and the length of the intermediate image in the Y direction is Y2, that is, when the magnification of the optical system including the concave mirror 9 and the front windshield 10 is super-high magnification, it is possible to achieve both downsizing and visibility while controlling the influence on the display position adjustment function of the virtual image.

In the image display apparatus 1000 in the first to third views, when the projection optical system is arranged on the optical path between the intermediate image generator 200 and the concave mirror 9 and further includes a mirror that folds back the optical path, it is possible to improve the degree of freedom of arrangement of a scanning optical system, the to-be-scanned surface 8, and the concave mirror 9. Furthermore, the optical path length from the to-be-scanned surface 8 to the concave mirror 9 can be slightly increased, and it is possible to decrease the degree of high magnification of the concave mirror 9, and thus to reduce generation of the deformation accordingly.

According to a mobile object apparatus including the image display apparatus 1000 and a mobile object equipped with the image display apparatus 1000, the position adjustment function of the virtual image can normally function, installation space of the image display apparatus 1000 can be reduced, and a mobile object apparatus having excellent visibility of a virtual image can be provided.

The horizontally-asymmetrical bent shape of the incidence area varies for each mobile object, and the degree of the bend may be very small or very large. In any cases, the image display apparatus 1000 according to the present example embodiment can reduce the deformation of a virtual image just by making the intermediate image oblique as necessary according to the horizontally-asymmetrical bent shape of the incidence area. The intermediate image may be made oblique very slightly. In other words, in the image display apparatus 1000 according to the present example embodiment, the visibility of a virtual image improves with a relatively simple configuration in which the general-purpose concave mirror 9 is used as the projection optical system.

When a right portion of the incidence area is bent backward to a greater degree, the intermediate image is made oblique such that a right portion of the image with reference to the right and left directions of the incidence area is displayed downward. As a result, the deformation of the virtual image, which is visually recognized through the front windshield 10, can be reduced with reliability.

In the above embodiment, the projection optical system is formed of a single curved mirror (the concave mirror 9) or of the concave mirror 9 and a folding mirror, but is not limited to these. For example, an optical element such as a mirror or lens may be provided before or after the concave mirror 9. It is desired that the projection optical system be compact and be capable of magnifying and projecting the intermediate image that is formed on the to-be-scanned surface 8. In alternative to the concave mirror 9, any desired convex mirror may be provided.

In the example embodiments described above, the to-be-scanned surface 8 (intermediate image) is arranged obliquely to the XZ plane, but may be arranged parallel to the XZ plane. In such cases, it is desired that the intermediate image be formed on the to-be-scanned surface 8 obliquely with reference to the X-axis direction (i.e., the right and left directions of the mobile object) when viewed from the Y-axis direction (i.e., the up-and-down directions of the mobile object). In other words, it is desired in the image display apparatus 1000 that the intermediate image be oblique with reference to the right and left directions of the mobile object when viewed from at least one of the forward and backward directions and the up-and-down directions of the mobile object.

In the example embodiment described above, cases in which a HUD is provided for a vehicle with right-side steering wheel were described. However, no limitation is indicated therein, and the HUD according to an example embodiment of the present invention may be applied to a vehicle with left-side steering wheel in a similar manner. More specifically, because a left portion of the incidence area is bent backward to a greater degree in a vehicle with left-side steering wheel as known in the art, it is desired that the intermediate image be made oblique such that a left portion of the image with reference to the right and left directions of the mobile object is displayed downward. When the to-be-scanned surface 8 is arranged parallel to the XZ plane, it is desired that the intermediate image be made oblique such that a left portion of the image with reference to the right and left directions of the mobile object is displayed backward.

In the example embodiment described above, a scanning optical system that includes a two-dimensional deflector is used as the image forming unit of a HUD. However, any type as long as a method, for example a spatial light modulation, can form an intermediate image, such as a transmissive liquid crystal type including a transmission-type liquid crystal panel, a reflective liquid crystal type including a reflection-type liquid crystal panel, and a DLP type including a digitalmicro mirror device (DMD), may be adopted.

In the example embodiment described above, a minute convex lens arrangement (including a microlens array) is used for a to-be-scanned surface. However, the to-be-scanned surface is not limited to this, for example, a diffuse reflection plate having a minute unevenness surface, a transmission screen having a smooth surface, or a reflection screen having a smooth surface may be used.

In the example embodiment described above, the image forming unit includes the concave mirror 7, but may not include the concave mirror 7.

In the microlens array according to the example embodiment described above, a plurality of microlenses are two-dimensionally arranged, but may be one-dimensionally or three-dimensionally arranged.

In the example embodiment described above, a two-dimensional deflector performs two-dimensional scanning on a microlens array to form a two-dimensional image. However, no limitation is indicated thereby, and a one-dimensional deflector such as a MEMS mirror, a galvano mirror, a polygon mirror may be used to perform one-dimensional scanning to form a one-dimensional image.

In the example embodiment described above, the image display apparatus 1000 supports color images, but may support monochrome images.

The transmission and reflection member may be made of a material other than that of the front windshield of a mobile object, and may be arranged between the front windshield and an observer, for example, like a combiner.

Moreover, the transmission and reflection member is not limited to the front windshield of the mobile object, but may be a different window (windshield) such as a side glass and a rear glass that is used for the visual recognition of the outside of the mobile object.

In the example embodiment described above, the transmission and reflection member is made of glass. However, no limitation is indicated thereby, and the transmission and reflection member may be made of, for example, resin.

With the image display apparatus according to the example embodiment described above, the deformation of a virtual image can effectively be attenuated, in particular, when a transmission and reflection member such as a window of a mobile object and a combiner is bent.

A target (observer) for which a virtual image is made visually recognizable by the image display apparatus according to the present example embodiment is not limited to the driver of the mobile object, but may be, for example, a navigator or passenger such as a fellow passenger who are in the mobile object.

The image display apparatus of an example embodiment of the present invention is also applicable to, for example, a head mount display attached to a human body.

In the example embodiment described above, cases in which the image display apparatus is provided for a mobile object such as a vehicle, an aircraft, and a ship were described. However, no limitation is indicated thereby, and modification may be made as long as the image display apparatus is provided for provided for an object. The term "object" includes not only a mobile object but also an object that is located on a permanent basis or an object that is transportable.

Followings are the inventor's thinking processes that led the inventor to contrive the above embodiment.

Recently, widening driving support with an augmented reality (AR) technology, in which display contents are controlled by cooperating with a sensor and images linked to backgrounds are presented, has been proposed and has attracted attention. Such an AR technology is required to be larger in view of visibility, and desired to extend a virtual image display area of a heads-up display (HUD).

For the purpose of diverse expressions or reduction of physiological stress, such as changes for adjustment in various situations, demands that a virtual image display distance (a distance from a viewpoint of an observer to the virtual image) is to be longer than a conventional one have been increased. To satisfy these demands and downsize a unit to a size capable of being equipped within a vehicle requires high technology.

JP-2013-061554-A discloses an image display apparatus that uses a projection optical system provided with a concave mirror and a convex mirror. Such a projection optical system is used in JP-2013-061554-A in order to achieve downsizing of the image display apparatus without sacrificing high brightness and large-size image. Moreover, JP-2013-061554-A discloses that it becomes easier to control the divergence angle of an intermediate image due to the use of the image display apparatus, and an efficient projection optical system with small loss in light quantity is achieved. Thus, it is possible to obtain a high brightness image without using a large-sized light source.

However, in the image display apparatus disclosed in JP-2013-061554-A, since the projection optical system includes two curved mirrors (a concave mirror and a convex mirror), it is unavoidable that the projection optical system becomes larger, which means that the apparatus as a whole cannot be downsized, and a large display is disadvantage.

The heads-up display apparatus is required to adjust the height of the virtual image according to an observer's physical constitution and preferences. For example, JP-5251853-B and JP-2009-196473-A disclose a configuration which changes the up-and-down directions position of the virtual image with a rotatable reflection mirror. However, the configuration requires two reflection mirrors, and thus has a disadvantage to downsize.

In order to solve the above disadvantage, the inventor contrived the above embodiment that can achieve both downsizing and visibility while controlling influence on a height adjustment function of a virtual image.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

In one embodiment, an image display apparatus mounted on an object or attached to a human body is provided. The image display apparatus includes: an image forming unit (200) to form an image with light; an optical system including a curved mirror that reflects the light forming the image toward a bent transmission and reflection member; and a rotator to rotate the curved mirror about a prescribed axis. A projection image on an XY plane of the image forms an angle θ1 with respect to an X direction. The image display apparatus controls position shift due to rotation of the curved mirror about the prescribed axis by the rotator in the X direction of a virtual image of the image visually recognized through the transmission and reflection member, where X denotes a lateral direction of the object or the human body and Y denotes a vertical direction of the object or the human body.

In one embodiments, an image display apparatus is provided, which may be provided for an object or attached to a human body. The image display apparatus includes an image forming unit to form an image with light, an optical system including a curved mirror that reflects the light forming the image toward a bent transmission and reflection member, a rotation mechanism to rotate the curved mirror about a prescribed axis, and a controller to adjust an angle θ2 formed by a projection image on an XY plane of the prescribed axis with respect to an X direction in response to a rotation amount of the curved mirror about the prescribed axis by the rotation mechanism. The projection image on an XY plane of the image forms an angle θ1 with respect to the X direction, where the X denotes a lateral direction of the object or the human body and the Y direction denotes a vertical direction of the object or the human body.

The invention claimed is:

1. An image display apparatus mounted on an object or attached to a human body, the image display apparatus comprising:
an image forming unit configured to form an image with light, the image forming unit including a to-be-scanned surface;
an optical system including a curved mirror that reflects the image from the image forming unit toward a bent transmission and reflection member; and
a rotator configured to rotate the curved mirror about a prescribed axis, wherein
a first projection image, which is a projection image on an XY plane of the to-be-scanned surface, has a longer side that forms an angle θ1 of tilt with respect to an X axis of the XY plane of the to-be-scanned surface, and
a second projection image, which is a projection image on an XY plane of the curved mirror, has a longer side that forms an angle θ2 of tilt with respect to the X axis of the XY plane of the curved mirror,
where the X denotes a lateral direction of the object or the human body and the Y direction denotes a vertical direction of the object or the human body, and the angle θ1 and the angle θ2 satisfy the condition |θ1|≠|θ2|.

2. The image display apparatus according to claim 1, wherein the first projection image and the second projection image have the same oblique directions with respect to the X direction.

3. The image display apparatus according to claim 1, wherein the angle θ1 and the angle θ2 satisfy the condition 0<|θ1|<|θ2|.

4. The image display apparatus according to claim 1, wherein the angle θ1 satisfies the condition 5°<θ1<30°.

5. The image display apparatus according to claim 1, wherein the angle θ2 satisfies the condition 10°<θ2<40°.

6. The image display apparatus according to claim 1, further comprising a processing device configured to adjust a position of the image in the X direction in response to rotation of the curved mirror about the prescribed axis by the rotator.

7. The image display apparatus according to claim 1, further comprising a controller configured to adjust the angle θ2 in response to the rotation of the curved mirror about the prescribed axis by the rotator.

8. The image display apparatus according to claim 1, wherein X1/X2>Y1/Y2>10 is established, where X1 denotes a length of the X direction of a virtual image of the image visually recognized through the transmission and reflection member, Y1 denotes a length of the Y direction, X2 denotes a length of the X direction of the image, and Y2 denotes a length of the Y direction.

9. The image display apparatus according to claim 1, wherein the optical system is arranged on an optical path between the image forming unit and the curved mirror, and further includes a mirror that folds back the optical path.

10. The image display apparatus according to claim 1, wherein the curved mirror is a concave mirror.

11. The image display apparatus according to claim 1, wherein the object is a mobile object, and the transmission and reflection member is a windshield of the mobile object.

12. An object apparatus comprising:
the image display apparatus according to claim 1; wherein the object is equipped with the image display apparatus.

13. The image display apparatus according to claim 1, wherein
the image forming unit includes a two-dimensional deflector, or a spatial light modulator.

14. An image display apparatus mounted on an object or attached to a human body, the image display apparatus comprising:
an image forming unit configured to form an image with light, the image forming unit including a to-be-scanned surface;
an optical system including a curved mirror that reflects the image from the image forming unit toward a bent transmission and reflection member;
a rotator configured to rotate the curved mirror about a prescribed axis; and
a processing device configured to adjust a position of the image in an X direction in response to rotation of the curved mirror about the prescribed axis by the rotator, wherein
a projection image on an XY plane of the to-be scanned surface has a longer side that forms an angle θ1 of tilt of the first projection image with respect to an X axis of the XY plane of the to-be-scanned surface, where the X denotes a lateral direction of the object or the human body and the Y direction denotes a vertical direction of the object or the human body, and
the prescribed axis forms an angle θ2 of tilt of the second projection image with respect to the X axis of the XY plane of the curved mirror, and the angle θ1 and the angle θ2 satisfy the condition |θ1|≠|θ2|.

15. The image display apparatus according to claim 14, wherein the angle θ1 and the angle θ2 satisfy the condition 0<|θ2|<|θ1|.

16. The image display apparatus according to claim 14, wherein the angle θ1 satisfies the condition 5°<θ1<30°.

17. An object apparatus comprising:
the image display apparatus according to claim 14; wherein
the object is equipped with the image display apparatus.

18. The image display apparatus according to claim 14, wherein
the image forming unit includes a two-dimensional deflector, or a spatial light modulator.

19. An image display apparatus mounted on an object or attached to a human body, the image display apparatus comprising:
an optical system including a to-be-scanned surface and a curved mirror that reflects light forming an image received from the to-be-scanned surface toward a bent transmission and reflection member; and
a rotator configured to rotate the curved mirror about a prescribed axis, wherein
a first projection image, which is a projection image on an XY plane of the to-be-scanned surface, has a longer side that forms an angle θ1 of tilt with respect to an X axis of the XY plane of the to-be-scanned surface, and
a second projection image, which is a projection image on an XY plane of the curved mirror, has a longer side that forms an angle θ2 of tilt with respect to the X axis of the XY plane of the curved mirror, where the X denotes a lateral direction of the object or the human body and the Y direction denotes a vertical direction of the object or the human body, and the angle θ1 and the angle θ2 satisfy the condition |θ1|≠|θ2|.

* * * * *